(12) United States Patent
Nishioka et al.

(10) Patent No.: US 11,925,305 B2
(45) Date of Patent: Mar. 12, 2024

(54) AUTONOMOUS TRAVEL-TYPE CLEANER AND CONTROL METHOD

(71) Applicant: PANASONIC INTELLECTUAL PROPERTY MANAGEMENT CO., LTD., Osaka (JP)

(72) Inventors: Shinichiro Nishioka, Shiga (JP); Yuko Tsusaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 394 days.

(21) Appl. No.: 17/403,514

(22) Filed: Aug. 16, 2021

(65) Prior Publication Data

US 2022/0167816 A1  Jun. 2, 2022

(30) Foreign Application Priority Data

Nov. 27, 2020 (JP) ................. 2020-196766

(51) Int. Cl.
*A47L 9/28* (2006.01)
*G05B 19/042* (2006.01)
*H04W 68/00* (2009.01)

(52) U.S. Cl.
CPC ........... *A47L 9/2857* (2013.01); *A47L 9/2805* (2013.01); *A47L 9/2852* (2013.01); *A47L 9/2894* (2013.01); *G05B 19/042* (2013.01); *H04W 68/005* (2013.01); *A47L 2201/04* (2013.01); *G05B 2219/25252* (2013.01)

(58) Field of Classification Search
CPC .... A47L 9/2857; A47L 9/2805; A47L 9/2852; A47L 9/2894; A47L 2201/04; G05B 19/042; G05B 2219/25252; H04W 68/005
See application file for complete search history.

(56) References Cited

U.S. PATENT DOCUMENTS

2014/0207280 A1  7/2014 Duffley et al.

FOREIGN PATENT DOCUMENTS

JP  2016-513981 A  5/2016

*Primary Examiner* — Mathew Franklin Gordon
(74) *Attorney, Agent, or Firm* — Rimon, P.C.

(57) ABSTRACT

An autonomous travel-type cleaner includes a housing, a drive unit for moving the housing, an incoming call detector that detects whether or not there is an incoming call to a communication terminal, a person detector that detects whether or not a person is present within a first range, an incoming call notification unit (for example, a light source and a speaker) for notifying of presence of an incoming call, and a controller. The controller controls a notification operation of the incoming call notification unit based on a detection result of the person detector and a detection result of the incoming call detector.

15 Claims, 18 Drawing Sheets

AUTONOMOUS TRAVEL-TYPE CLEANER AND CONTROL METHOD

CROSS-REFERENCE OF RELATED APPLICATIONS

This application claims the benefit of Japanese Application No. 2020-196766, filed on Nov. 27, 2020, the entire disclosure of which Application is incorporated by reference herein.

BACKGROUND

1. Technical Field

The present disclosure relates to an autonomous travel-type cleaner and a control method.

2. Description of the Related Art

Conventionally, an autonomous travel-type cleaner that cleans a floor surface while autonomously traveling is known. There is known an autonomous travel-type cleaner that controls a cleaning mode of the autonomous travel-type cleaner when a communication terminal such as a mobile phone receives an incoming call when the autonomous travel-type cleaner is used at home (See, for example, JP 2016-513981 W (hereinafter, referred to as "PTL 1")).

For example, in PTL 1, when the communication terminal receives an incoming call, the autonomous travel-type cleaner stops cleaning, but a person may not notice presence of an incoming call to the communication terminal, for example, when a person is not near the communication terminal. As described above, in the autonomous travel-type cleaner, it is desirable to perform appropriate control when the communication terminal receives an incoming call.

SUMMARY

The present disclosure provides an autonomous travel-type cleaner and a control method capable of making a person easily notice presence of an incoming call to a communication terminal.

An autonomous travel-type cleaner according to one aspect of the present disclosure is an autonomous travel-type cleaner capable of communicating with a communication terminal. The autonomous travel-type cleaner includes a housing, a drive unit that is provided in the housing for moving the housing, an incoming call detector that detects whether or not there is an incoming call to a communication terminal, a person detector that detects whether or not a person is present within a first range, an incoming call notification unit for notifying of presence of the incoming call, and a controller. The controller controls a notification operation of the incoming call notification unit based on a detection result of the person detector and a detection result of the incoming call detector.

Further, an autonomous travel-type cleaner according to one aspect of the present disclosure is an autonomous travel-type cleaner capable of communicating with a communication terminal. The autonomous travel-type cleaner includes a housing, a drive unit that is provided in the housing for moving the housing, an incoming call detector that detects whether or not there is an incoming call to a communication terminal, an incoming call notification unit for notifying of presence of the incoming call, an incoming call notifying mode detector that detects an incoming call notifying mode of the communication terminal, and a controller. The controller controls a notification operation of the incoming call notification unit based on a detection result of the incoming call notifying mode detector and a detection result of the incoming call detector.

Further, a control method according to one aspect of the present disclosure is a control method in an autonomous travel-type cleaner capable of communicating with a communication terminal. This control method includes: an incoming call detection step of detecting whether or not there is an incoming call to the communication terminal, a person detection step of detecting whether or not a person is present within a first range, and a control step of controlling a notification operation of an incoming call notification unit for notifying of presence of the incoming call based on a detection result in the person detection step and a detection result in the incoming call detection step.

Further, a control method according to one aspect of the present disclosure is a control method in an autonomous travel-type cleaner capable of communicating with a communication terminal. This control method includes: an incoming call detection step of detecting whether or not there is an incoming call to the communication terminal, an incoming call notifying mode detection step of detecting an incoming call notifying mode of the communication terminal, and a control step of controlling a notification operation of an incoming call notification unit for notifying of presence of the incoming call based on a detection result in the incoming call notifying mode detection step and a detection result in the incoming call detection step.

Note that the present disclosure may be achieved as a program for causing a computer to implement the control method. In addition, the program may be achieved as a non-transitory recording medium such as a compact disc read-only memory (CD-ROM) readable by a computer recording the program. In addition, the present disclosure may be achieved as information, data, or a signal indicating the program. These programs, information, data, and signals may be distributed via a communication network such as the Internet.

According to the present disclosure, it is possible to provide an autonomous travel-type cleaner and a control method capable of making a person easily notice presence of an incoming call to a communication terminal.

DETAILED DESCRIPTION

Figure 1:
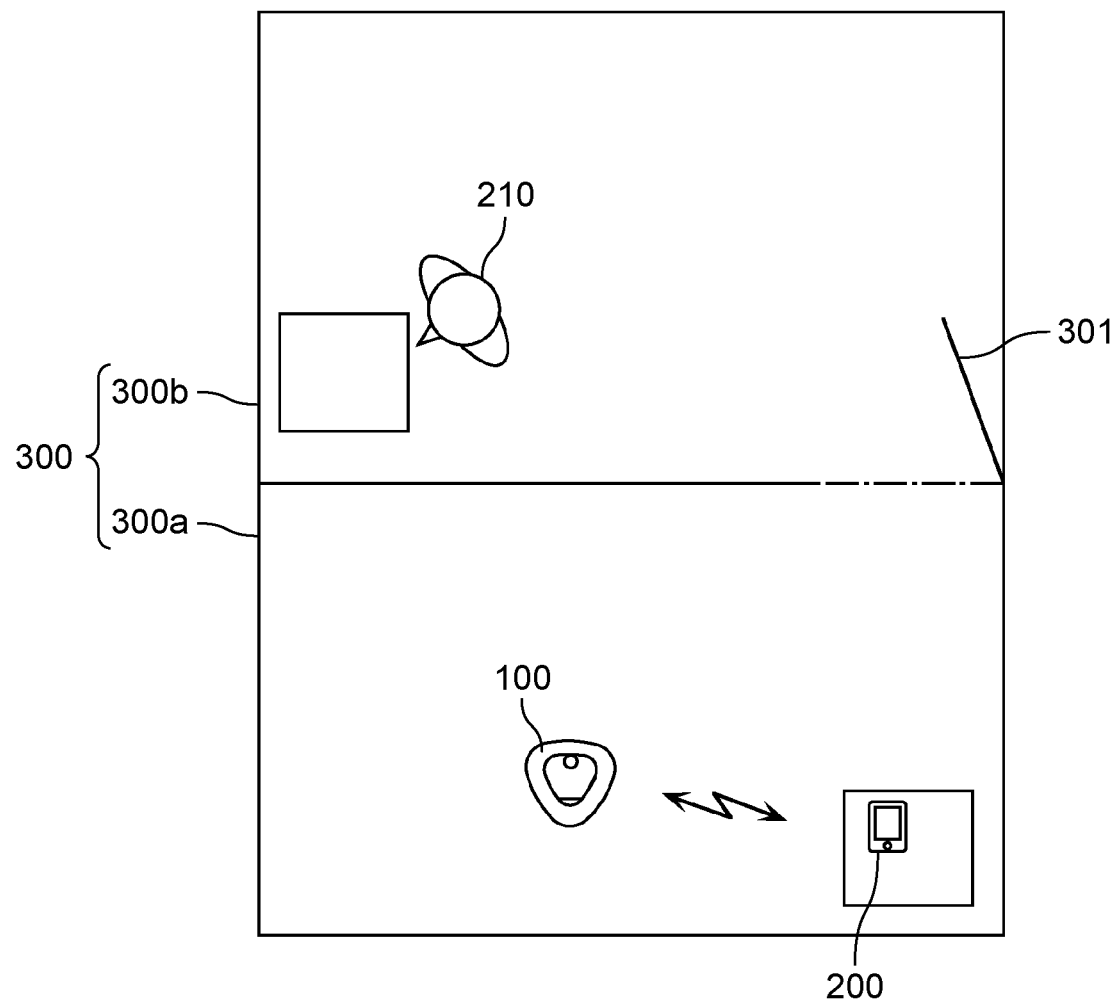
FIG. 1 is a view for describing an outline of an autonomous travel-type cleaner according to an exemplary embodiment.

Hereinafter, an exemplary embodiment of an autonomous travel-type cleaner or the like according to the present disclosure will be described in detail with reference to the drawings. The following exemplary embodiment each illustrate a preferred specific example of the present disclosure. Therefore, numerical values, shapes, components, arranged positions and connection forms of the components, steps, orders of steps, etc., to be used in the following exemplary embodiment are illustrative and are not to limit the scope of the present disclosure. Those components introduced in the following exemplary embodiment that are not recited in the independent claim(s) representing the most superordinate concept are illustrated herein as optional components.

It should be noted that the inventors of the present disclosure provide the accompanying drawings and the following description in order to allow those skilled in the art to fully understand the present disclosure, and do not intend to limit the subject matter described in the appended claims by the accompanying drawings and the following description.

Each of the drawings is a schematic diagram, and is not necessarily strictly illustrated. In the drawings, substantially the same components are denoted by the same reference numerals, and redundant description may be omitted or simplified.

In the following exemplary embodiment, an expression using "substantially" such as a substantially triangular shape is used. For example, a substantially triangular shape means not only a completely triangular shape but also a substantially triangular shape, that is, for example, a rounded triangle. The same applies to other expressions using "substantially". Further, in the following exemplary embodiment, a case where an autonomous travel-type cleaner that cleans a floor surface of a predetermined space while traveling on the floor surface is viewed from vertically above may be referred to as a top view, and a case where the autonomous travel-type cleaner is viewed from vertically below may be referred to as a bottom view.

Exemplary Embodiment

[Overview]

First, an outline of an autonomous travel-type cleaner according to an exemplary embodiment will be described.

FIG. 1 is a view for describing an outline of autonomous travel-type cleaner 100 according to the exemplary embodiment. Autonomous travel-type cleaner 100 according to the exemplary embodiment is an autonomous travel-type cleaner which autonomously travels and cleans a predetermined space. Autonomous travel-type cleaner 100 autonomously travels and cleans predetermined cleaning area 300, for example. Autonomous travel-type cleaner 100 runs around while sensing a predetermined space (more specifically, in a predetermined space) using a sensor such as light detection and ranging (LIDAR) or a camera, thereby generating map information (data) indicating a map of the predetermined space. Autonomous travel-type cleaner 100 calculates a travel route on which autonomous travel-type cleaner travels when cleaning a predetermined space based on the generated map information. Autonomous travel-type cleaner 100 travels in a predetermined space along the calculated travel route to perform cleaning.

Autonomous travel-type cleaner 100 autonomously determines whether or not to avoid an object (obstacle) present in a predetermined space, for example, by sensing a state of the predetermined space by using sensors such as laser range finder 40, camera 60, and a cliff sensor. When the obstacle is present, the autonomous travel-type cleaner leaves the calculated travel route and travels while avoiding the object to perform cleaning.

Autonomous travel-type cleaner 100 generates map information of a predetermined space to be cleaned and estimates a self-position of autonomous travel-type cleaner 100 on a map indicated by the generated map information by simultaneous localization and mapping (SLAM), for example.

Autonomous travel-type cleaner 100 can communicate with communication terminal 200. For example, when detecting presence of an incoming call to communication terminal 200, autonomous travel-type cleaner 100 notifies person 210 of presence of an incoming call in an appropriate form, so that person 210 can easily notice presence of the incoming call. In the present specification, the incoming call is an incoming call to be notified to a person, and is, for example, an incoming call for calling a call, a so-called incoming call. Note that the incoming call may be an incoming call such as a mail or a message.

Communication terminal 200 is, for example, a property of person 210. Communication terminal 200 communicates with autonomous travel-type cleaner 100, and transmits information regarding presence or absence of an incoming call, a call state, an incoming call notifying mode, and the like to autonomous travel-type cleaner 100. For example, an application program for communicating with autonomous travel-type cleaner 100 and exchanging various kinds of information with autonomous travel-type cleaner 100 is installed in communication terminal 200. Communication terminal 200 is specifically a fixed-line phone, a mobile phone, a tablet-type communication terminal, or the like.

Cleaning area 300 is, for example, at least a part of a house in which person 210 lives. Cleaning area 300 is an area surrounded by a wall or the like in a building. At least a part of cleaning area 300 may be surrounded by a virtual wall set by autonomous travel-type cleaner 100. In addition, cleaning area 300 may include an entry prohibited area corresponding to a position where an obstacle such as furniture is disposed, and cleaning area 300 other than the entry prohibited area may be cleaned.

For example, cleaning area 300 is divided into a plurality of sub areas which are unit areas for performing cleaning for each room of the house, and includes sub-area 300a and sub-area 300b in the example of FIG. 1. Depending on the size of the room, one room may be divided into a plurality of sub-areas each having a shape such as a rectangle having one side of 5 m or less, for example. Autonomous travel-type cleaner 100 can pass through at least a part between sub-area 300a and sub-area 300b. In the example of FIG. 1, door 301 through which autonomous travel-type cleaner 100 can pass by being opened is provided between sub-area 300a and sub-area 300b. Note that cleaning area 300 may not be divided into a plurality of areas.

[Configuration]

Figure 2:
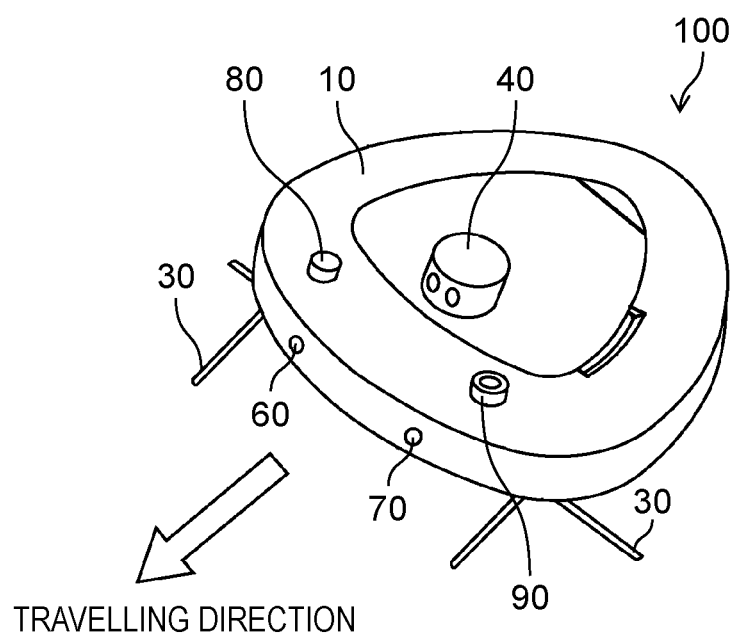
FIG. 2 is a perspective view illustrating an external appearance of the autonomous travel-type cleaner according to the exemplary embodiment.
Figure 3:
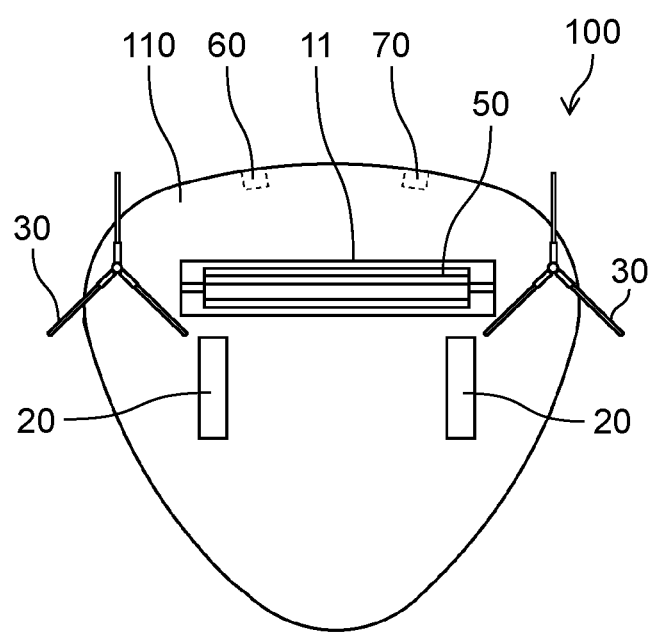
FIG. 3 is a bottom view illustrating an external appearance of the autonomous travel-type cleaner according to the exemplary embodiment.

Next, a configuration of autonomous travel-type cleaner 100 according to the exemplary embodiment will be described. FIG. 2 is a perspective view illustrating an external appearance of autonomous travel-type cleaner 100 according to the exemplary embodiment. FIG. 3 is a bottom view illustrating an external appearance of autonomous travel-type cleaner 100 according to the exemplary embodiment.

Autonomous travel-type cleaner 100 includes, for example, housing 10, two wheels 20, two side brushes 30, laser range finder 40, main brush 50, camera 60, depth sensor 70, light source 80, and speaker 90.

Housing 10 is a housing that houses components included in autonomous travel-type cleaner 100. In the present exemplary embodiment, housing 10 has a substantially triangular shape in a top view. Note that the shape of housing 10 in a top view is not particularly limited. The top view shape of housing 10 may be, for example, a substantially rectangular shape or a substantially circular shape. As shown in FIG. 3, housing 10 has suction port 11 on the bottom surface.

Two wheels 20 are wheels for causing autonomous travel-type cleaner 100 to travel.

Side brush 30 is a brush that is provided on the bottom surface of housing 10 for cleaning a floor in a predetermined space (hereinafter, also simply referred to as a floor). In the present exemplary embodiment, autonomous travel-type cleaner 100 includes two side brushes 30. A number of side brushes 30 included in autonomous travel-type cleaner 100 may be one or three or more, and is not particularly limited.

Laser range finder 40 is a sensor for measuring a distance between autonomous travel-type cleaner 100 and an object, a wall surface, or the like in a predetermined space. Laser range finder 40 is provided, for example, in an upper portion of housing 10. Laser range finder 40 is, for example, a so-called LIDAR.

Main brush 50 is a brush that is disposed in suction port 11 as an opening formed in a bottom surface of housing 10 for sucking dust on a floor.

Camera 60 is a sensor that acquires an image of a predetermined space. Specifically, camera 60 is an imaging device that is disposed in housing 10 and generates an image by imaging a predetermined space.

Depth sensor 70 is, for example, a sensor that detects a distance between a subject included in an image generated by camera 60 and autonomous travel-type cleaner 100. Depth sensor 70 is, for example, an infrared sensor.

Light source 80 is used to notify of presence of an incoming call to communication terminal 200, and is an example of an incoming call notification unit. Light source 80 notifies of presence of an incoming call in a form of not outputting a sound. Light source 80 is, for example, a light-emitting diode (LED) lamp.

Speaker 90 is used to notify of presence of an incoming call to communication terminal 200, and is an example of an incoming call notification unit. Speaker 90 notifies of presence of an incoming call in a form of outputting a sound. Autonomous travel-type cleaner 100 may include a buzzer instead of speaker 90.

In this manner, the incoming call notification unit notifies of presence of an incoming call in a form of outputting a sound like sound output by speaker 90 or in a form of not outputting a sound like light emission by light source 80.

Figure 4:
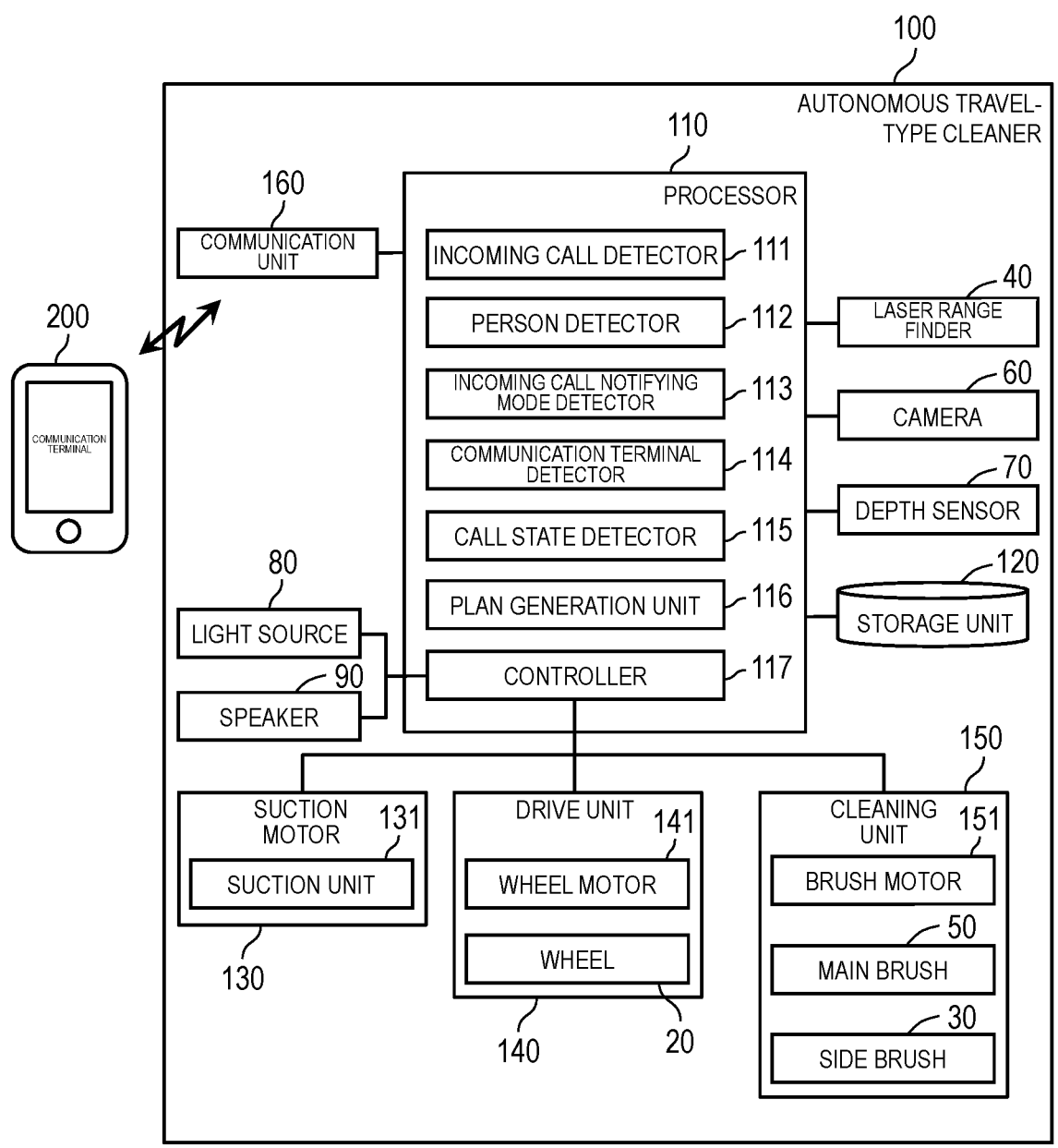
FIG. 4 is a block diagram illustrating a characteristic functional configuration of the autonomous travel-type cleaner according to the exemplary embodiment.

FIG. 4 is a block diagram illustrating a characteristic functional configuration of autonomous travel-type cleaner 100.

As illustrated in FIG. 4, autonomous travel-type cleaner 100 includes laser range finder 40, camera 60, depth sensor 70, light source 80, speaker 90, processor 110, storage unit 120, suction unit 130, drive unit 140, cleaning unit 150, and communication unit 160.

Processor 110 performs information processing in autonomous travel-type cleaner 100, control of an operation performed by autonomous travel-type cleaner 100, and the like. Processor 110 is achieved by, for example, one or a plurality of processors. Processor 110 may be achieved by a microcomputer, a dedicated circuit, or the like. Processor 110 includes incoming call detector 111, person detector 112, incoming call notifying mode detector 113, communication terminal detector 114, call state detector 115, plan generation unit 116, and controller 117.

Incoming call detector 111 detects (in other words, determines) whether or not there is an incoming call to communication terminal 200.

Person detector 112 detects (in other words, determines) whether or not person 210 is present within a predetermined first range.

Incoming call notifying mode detector 113 detects an incoming call notifying mode of communication terminal 200.

Communication terminal detector 114 detects (in other words, determines) whether or not communication terminal 200 is present within a predetermined second range.

Call state detector 115 detects (in other words, determines) whether or not communication terminal 200 is in a call state.

Plan generation unit 116 generates plan information indicating a cleaning mode of autonomous travel-type cleaner 100 based on map information indicating cleaning area 300. For example, plan generation unit 116 generates a cleaning plan (in other words, plan information) on how autonomous travel-type cleaner 100 travels and cleans cleaning area 300, that is, a travel route of cleaning in cleaning area 300 by autonomous travel-type cleaner 100.

In addition, plan generation unit 116 generates a cleaning plan in which a travel route (in other words, a travel route of housing 10) of autonomous travel-type cleaner 100, specifically, a travel method which is a control method of drive unit 140 such as the rotation speed of wheel motor 141 and the direction of wheels 20 is determined based on the acquired map information.

In addition to the travel route of autonomous travel-type cleaner 100, plan generation unit 116 generates a cleaning plan indicating a cleaning method including a control method of suction unit 130 (for example, the suction force, more specifically, the rotation speed of suction motor 131)

and a control method of cleaning unit 150 (for example, the rotation speed of brush motor 151).

Controller 117 controls the notification operation of the incoming call notification unit (for example, light source 80, speaker 90, or drive unit 140) based on various detection results of incoming call detector 111, person detector 112, incoming call notifying mode detector 113, communication terminal detector 114, call state detector 115, and the like. Specifically, controller 117 controls the incoming call notification unit on the basis of various detection results to change whether or not to cause the incoming call notification unit to perform notification and a notification form when causing the incoming call notification unit to perform notification.

Furthermore, controller 117 controls drive unit 140 on the basis of various detection results to move housing 10.

Further, controller 117 controls traveling of housing 10 based on the cleaning plan generated by plan generation unit 116, and causes autonomous travel-type cleaner 100 to clean cleaning area 300. Controller 117 controls suction unit 130, drive unit 140, and cleaning unit 150 to cause autonomous travel-type cleaner 100 to travel and clean cleaning area 300.

Storage unit 120 is a memory that stores a control program and the like executed by processor 110. Storage unit 120 may store various types of information such as map information. Storage unit 120 is achieved by, for example, a semiconductor memory, a hard disk drive (HDD), or the like.

Suction unit 130 is a mechanism for sucking dust on a floor surface of a predetermined space by sucking the floor surface. Suction unit 130 includes, for example, suction motor 131.

Suction motor 131 is a motor that is connected to a fan for sucking dust on the floor surface by rotating the fan.

Drive unit 140 is a mechanism that is provided in housing 10 for moving housing 10 (that is, autonomous travel-type cleaner 100). Drive unit 140 may function as an incoming call notification unit for notifying of presence of an incoming call to communication terminal 200 by causing housing 10 to travel in a predetermined traveling mode under the control of controller 117. That is, the incoming call notification unit may notify of presence of an incoming call with the traveling mode of housing 10. Drive unit 140 includes, for example, wheel motor 141 and wheel 20.

Wheel motor 141 is a motor that is connected to wheel 20 for rotating wheel 20.

Autonomous travel-type cleaner 100 can freely travel such as straight travel, backward travel, left rotation, and right rotation by independently controlling rotation of two wheels 20. Note that, autonomous travel-type cleaner 100 may further include wheels (auxiliary wheels) which are not rotated by wheel motor 141.

Cleaning unit 150 is a mechanism for cleaning the floor surface. Cleaning unit 150 includes, for example, brush motor 151, main brush 50, and side brush 30.

Brush motor 151 is a motor that is connected to a brush such as main brush 50 for driving (rotating) the brush such as main brush 50.

Communication unit 160 is a communication module (communication circuit) that can freely communicate with an external device such as communication terminal 200. Communication unit 160 communicates with an external device such as communication terminal 200 by short-range wireless communication such as Wi-Fi (registered trademark) or Bluetooth (registered trademark). The communication standard used for the communication performed by communication unit 160 is not particularly limited.

Operation

Next, an operation of autonomous travel-type cleaner 100 according to the exemplary embodiment will be described with reference to an operation example. In the following description of the operation example, description of substantially similar processing may be omitted or simplified.

Operation Example 1

First, Operation Example 1 of autonomous travel-type cleaner 100 according to the exemplary embodiment will be described.

Figure 5:
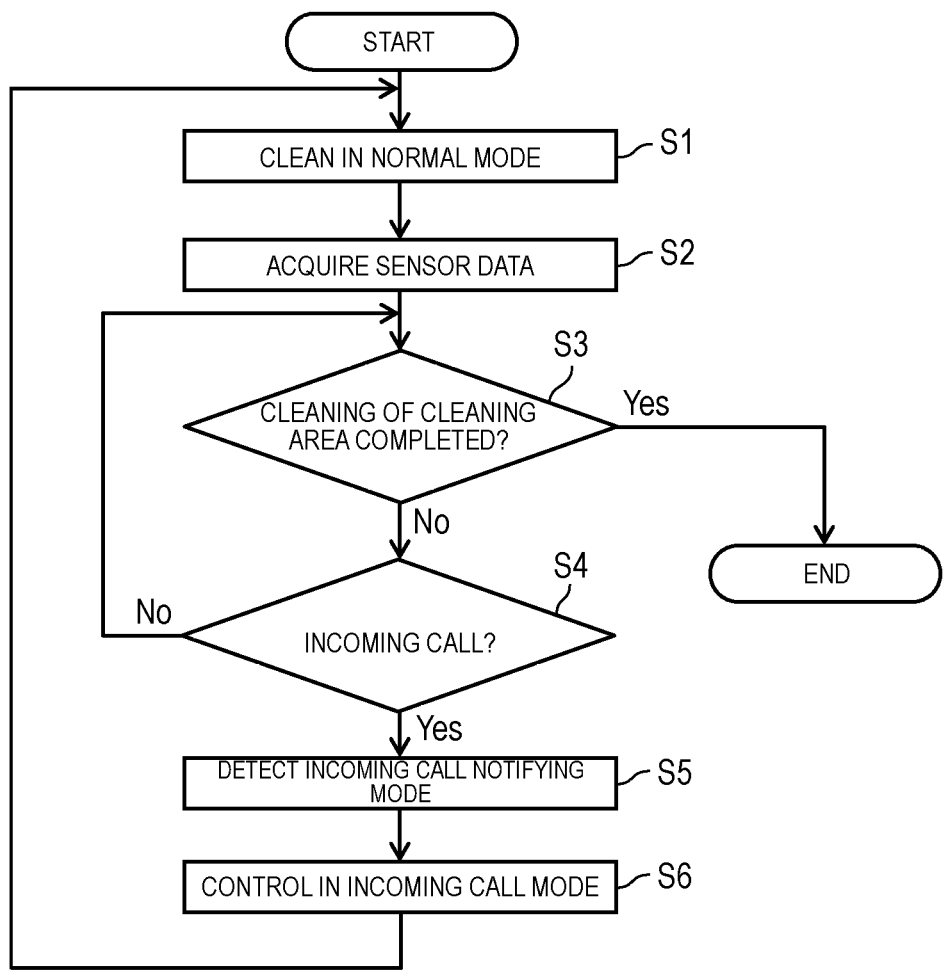
FIG. 5 is a flowchart illustrating a processing procedure in Operation Example 1 of the autonomous travel-type cleaner according to the exemplary embodiment.

FIG. 5 is a flowchart illustrating a processing procedure in Operation Example 1 of autonomous travel-type cleaner 100 according to the exemplary embodiment.

Autonomous travel-type cleaner 100 starts cleaning by, for example, receiving a signal instructing to start cleaning from a user. A method for receiving a signal by autonomous travel-type cleaner 100 is not particularly limited. For example, autonomous travel-type cleaner 100 receives a signal transmitted by a user operating a communication terminal such as a smartphone through communication unit 160. Further, autonomous travel-type cleaner 100 may have an operation unit such as a button for acquiring a cleaning start instruction from the user.

As shown in FIG. 5, first, autonomous travel-type cleaner 100 performs cleaning in a normal mode (step S1).

In order to start cleaning in the normal mode, first, plan generation unit 116 acquires, for example, map information. Plan generation unit 116 acquires map information indicating a map of cleaning area 300 stored in storage unit 120. Note that, in a case where the map information does not exist in storage unit 120, for example, plan generation unit 116 may acquire the map information by generating the map information by SLAM. Then, plan generation unit 116 generates a cleaning plan regarding a travel route of cleaning in cleaning area 300 by housing 10 on the basis of the acquired map information. For example, plan generation unit 116 calculates a travel route on the basis of the map information on the assumption that entire cleaning area 300 is an area to be cleaned, and controller 117 controls suction unit 130, drive unit 140, and cleaning unit 150 on the calculated travel route, thereby generating a cleaning plan for causing autonomous travel-type cleaner 100 to travel and clean. Plan generation unit 116 may generate a cleaning plan for sequentially cleaning each of the plurality of sub-areas 300a and 300b. For example, in cleaning of each of the plurality of sub-areas 300a and 300b, plan generation unit 116 generates a travel plan in which autonomous travel-type cleaner 100 reciprocates along any direction of two sets of sides of a rectangle from a corner portion of the rectangle area, and travels the entire area of the rectangle area while gradually traveling in a direction orthogonal to the direction. Note that plan generation unit 116 may generate a cleaning plan by acquiring a cleaning plan stored in advance in storage unit 120, an external device, or the like.

Based on the cleaning plan thus generated, autonomous travel-type cleaner 100 starts cleaning in the normal mode. In the present specification, the normal mode is a mode in which controller 117 controls suction unit 130, drive unit 140, and cleaning unit 150 based on the generated cleaning plan. In the normal mode, controller 117 acquires sensor data from a sensor such as laser range finder 40, for example, and detects the self position on the basis of the sensor data and the map information. For example, while housing 10 is traveling, controller 117 causes housing 10 to travel on the basis of the cleaning plan while repeatedly detecting the self-position.

Next, when cleaning is started, person detector 112 periodically acquires sensor data from sensors such as laser range finder 40 and camera 60 (step S2). For example, person detector 112 acquires sensor data (for example, a plurality of pieces of polar coordinate data centering on autonomous travel-type cleaner 100) detected by laser range finder 40 scanning 360° or a predetermined angle range around autonomous travel-type cleaner 100.

Person detector 112 may acquire an image captured by camera 60 as sensor data. Person detector 112 repeatedly acquires sensor data while autonomous travel-type cleaner 100 performs cleaning. Person detector 112 uses the acquired sensor data for detection of person 210. A specific person detection method by person detector 112 will be described in steps described later. Note that person detector 112 may acquire sensor data from a device other than laser range finder 40 and camera 60. For example, person detector 112 may acquire the sensor data from the sensor installed in cleaning area 300 through communication unit 160.

Next, controller 117 determines whether or not cleaning of cleaning area 300 is completed (step S3). For example, controller 117 determines whether or not autonomous travel-type cleaner 100 has made a round of the travel route in the cleaning plan based on the acquired history of the self-position, thereby determining whether or not the cleaning of cleaning area 300 is completed.

Controller 117, when determining that cleaning of cleaning area 300 is completed (Yes in step S3), ends cleaning in cleaning area 300 by autonomous travel-type cleaner 100. For example, controller 117 controls drive unit 140 to move autonomous travel-type cleaner 100 to a predetermined position such as a charger (not illustrated), and ends cleaning.

On the other hand, when controller 117 determines that cleaning of cleaning area 300 is not completed (No in step S3), incoming call detector 111 detects whether or not there is an incoming call to communication terminal 200 (step S4). Incoming call detector 111 detects presence of an incoming call to communication terminal 200, for example, by acquiring incoming call information, which is transmitted from communication terminal 200, indicating presence of an incoming call to communication terminal 200 using communication unit 160. On the other hand, when incoming call information is not acquired, incoming call detector 111 detects that there is no incoming call to communication terminal 200. For example, when there is an incoming call to communication terminal 200, communication terminal 200 transmits incoming call information to autonomous travel-type cleaner 100.

When incoming call detector 111 detects that there is no incoming call to communication terminal 200 (No in step S4), autonomous travel-type cleaner 100 returns the processing to step S3, and continues the cleaning in cleaning area 300 until the cleaning of cleaning area 300 is completed.

On the other hand, when incoming call detector 111 detects presence of an incoming call to communication terminal 200 (Yes in step S4), incoming call notifying mode detector 113 detects the incoming call notifying mode of communication terminal 200 (step S5). Incoming call notifying mode detector 113, for example, acquires incoming call notifying mode information, which is transmitted from communication terminal 200, indicating an incoming call notifying mode of communication terminal 200 using communication unit 160, and detects the incoming call notifying mode based on the acquired incoming call notifying mode information. That is, incoming call notifying mode detector 113 detects the incoming call notifying mode of communication terminal 200 indicated by the incoming call notifying mode information.

Communication terminal 200 transmits, for example, the incoming call notifying mode information together with the incoming call information to autonomous travel-type cleaner 100. Further, when cleaning by autonomous travel-type cleaner 100 is started, or when the incoming call notifying mode of communication terminal 200 is changed, communication terminal 200 may transmit the incoming call notifying mode information to autonomous travel-type cleaner 100.

Next, autonomous travel-type cleaner 100 performs the control in the incoming call mode (step S6), and thereafter, returns the processing to step S1 to resume the cleaning in the normal mode. Details of the incoming call mode (step S6) will be described later.

Note that, in Operation Example 1, step S2 or step S5 may not be performed and may be skipped.

Operation Example 2

Figure 6:
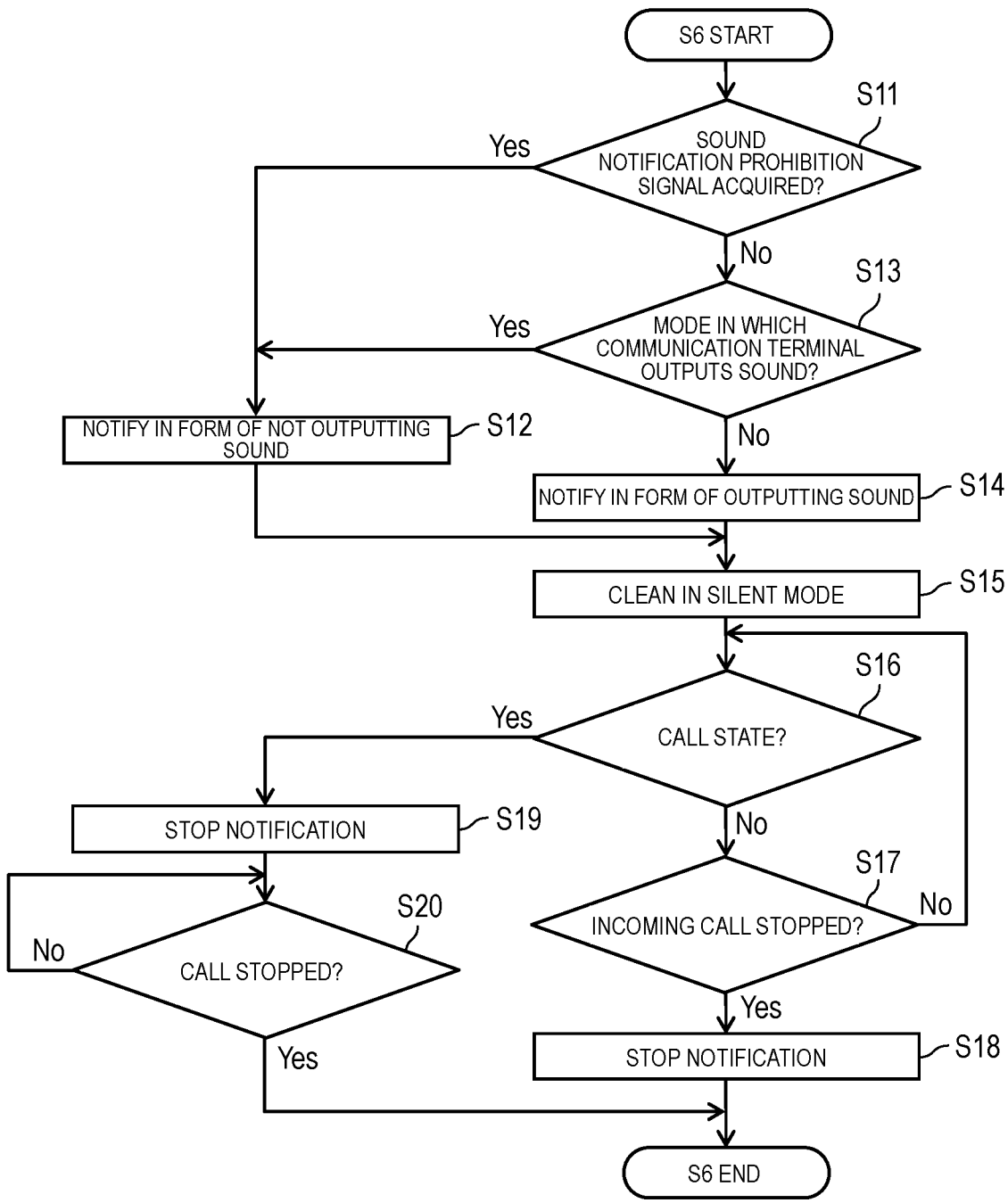
FIG. 6 is a flowchart illustrating a processing procedure in Operation Example 2 of the autonomous travel-type cleaner according to the exemplary embodiment.

Next, Operation Example 2, which is a first example of the processing procedure of the control in the incoming call mode in step S6 of Operation Example 1, will be described. FIG. 6 is a flowchart illustrating a processing procedure in Operation Example 2 of autonomous travel-type cleaner 100 according to the exemplary embodiment. In addition, Operation Example 2 is an operation example in a case where detection by person detector 112 is not performed. Therefore, when the process of Operation Example 2 is performed, step S2 in Operation Example 1 may not be performed.

As shown in FIG. 6, first, controller 117 determines whether or not a sound notification prohibition signal has been acquired (step S11). The sound notification prohibition signal is a signal for instructing to notify of presence of an incoming call to communication terminal 200 in a form that autonomous travel-type cleaner 100 does not output a sound. The sound notification prohibition signal is transmitted from communication terminal 200 to autonomous travel-type cleaner 100, for example, when the user performs an operation on the communication terminal 200 to instruct to perform notification in a form that autonomous travel-type cleaner 100 does not output a sound. Further, autonomous travel-type cleaner 100 may have an operation unit that receives a user's operation instructing to perform notification in a form that autonomous travel-type cleaner 100 does not output a sound. The sound notification prohibition signal is output to controller 117 by operation of the operation unit. Further, when acquiring the incoming call notifying mode information indicating that the incoming call notifying mode of communication terminal 200 is a silent mode (details will be described later), incoming call notifying mode detector 113 may output the sound notification prohibition signal to controller 117.

When determining that the sound notification prohibition signal has been acquired (Yes in step S11), controller 117 causes the incoming call notification unit to notify of presence of an incoming call to communication terminal 200 in a form of not outputting a sound (step S12). For example, controller 117 causes light source 80 to emit light. Controller 117 may cause light source 80 to emit light in a predetermined form such as a specific light color or a blinking pattern. Furthermore, controller 117 may control drive unit 140 to cause housing 10 to travel in a predetermined traveling mode such as drawing a circle or drawing a figure of 8. By these methods, autonomous travel-type cleaner 100 notifies of presence of an incoming call to communication terminal 200 in a form of not outputting a sound.

On the other hand, when determining that the sound notification prohibition signal has not been acquired (No in step S11), controller 117 determines whether or not the incoming call notifying mode detected by incoming call notifying mode detector 113 in step S5 described above is a mode in which communication terminal 200 performs notification in a form of outputting a sound (step S13). For example, in a case where the detected incoming call notifying mode is a mode in which the incoming call is notified by both sound output and vibration or a mode in which the incoming call is notified only by sound output, controller 117 determines that the mode is a mode in which communication terminal 200 performs notification in a form of outputting a sound. Further, for example, when the detected incoming call notifying mode is a mode in which the incoming call is notified only by vibration (so-called manner mode) or a mode in which neither sound output nor vibration is performed even when there is an incoming call (so-called silent mode), controller 117 determines that the mode is not a mode in which communication terminal 200 performs notification in a form of outputting a sound.

When determining that the detected incoming call notifying mode is a mode in which communication terminal 200 performs notification in a form of outputting a sound (Yes in step S13), controller 117 causes the incoming call notification unit to notify of presence of an incoming call to communication terminal 200 in a form of not outputting a sound (step S12).

On the other hand, when determining that the detected incoming call notifying mode is not a mode in which communication terminal 200 performs notification in a form of outputting a sound (No in step S13), controller 117 causes the incoming call notification unit to notify communication terminal 200 of presence of an incoming call in a form of outputting a sound (step S14). Controller 117 causes speaker 90 to output, for example, a sound such as predetermined music, a buzzer sound, or a message voice.

After step S12 or step S14, autonomous travel-type cleaner 100 performs cleaning in the silent mode while continuing the notification (step S15). In the present specification, the silent mode is a mode in which controller 117 controls suction unit 130, drive unit 140, and cleaning unit 150 such that the sound generated by cleaning becomes smaller than in the normal mode. Controller 117 controls, for example, suction unit 130 and cleaning unit 150 to lower the rotation speeds of suction motor 131 and brush motor 151 than in the normal mode, thereby causing autonomous travel-type cleaner 100 to perform cleaning in the silent mode. This makes it easy for person 210 to notice notification of the incoming call by communication terminal 200 and autonomous travel-type cleaner 100. Note that, in step S15, autonomous travel-type cleaner 100 may stop the cleaning instead of performing the cleaning in the silent mode. That is, controller 117 may stop suction motor 131 and brush motor 151.

Next, call state detector 115 detects whether or not communication terminal 200 is in a call state (step S16). Call state detector 115 detects that communication terminal 200 is in the call state, for example, by acquiring call state information, which is transmitted from communication terminal 200, indicating that communication terminal 200 is in the call state using communication unit 160. On the other hand, for example, when the call state information is not acquired, call state detector 115 detects that communication terminal 200 is not in the call state. For example, when communication terminal 200 starts a call and communication terminal 200 enters a call state, communication terminal 200 transmits call state information to autonomous travel-type cleaner 100.

When call state detector 115 detects that communication terminal 200 is not in the call state (No in step S16), incoming call detector 111 detects whether or not the incoming call to communication terminal 200 is stopped (step S17). Incoming call detector 111 detects that the incoming call to communication terminal 200 is stopped, for example, by acquiring incoming call stop information, which is transmitted from communication terminal 200, indicating that the incoming call to communication terminal 200 is stopped using communication unit 160. On the other hand, when the incoming call stop information is not acquired, for example, incoming call detector 111 detects that the incoming call to communication terminal 200 is not stopped. For example, when the incoming call to communication terminal 200 is stopped, communication terminal 200 transmits the incoming call stop information to autonomous travel-type cleaner 100.

When incoming call detector 111 detects that the incoming call to communication terminal 200 is stopped (Yes in step S17), controller 117 stops the notification by the incoming call notification unit (step S18). Then, autonomous travel-type cleaner 100 ends the processing in step S6 (incoming call mode), and performs the processing in step S1, namely, the cleaning in the normal mode again.

On the other hand, when incoming call detector 111 detects that the incoming call to communication terminal 200 is not stopped (No in step S17), autonomous travel-type cleaner 100 returns the processing to step S16, and continues the detection of the call state until the incoming call to communication terminal 200 is stopped.

When call state detector 115 detects that communication terminal 200 is in the call state (Yes in step S16), controller 117 stops the notification by the incoming call notification unit (step S19). As described above, when communication terminal 200 is in the call state, the notification is stopped, so that it is possible to prevent the notification from hindering the call by person 210 on communication terminal 200. In addition, in step S19, controller 117 may control drive unit 140 to temporarily move autonomous travel-type cleaner 100 to a predetermined position such as a charger (not shown) simultaneously with the stop of the notification or after a predetermined time elapses from the stop of the notification.

Next, call state detector 115 detects whether or not the call by communication terminal 200 has stopped (step S20). Call state detector 115 detects that the call by communication terminal 200 has stopped, for example, by acquiring call stop information, which is transmitted from communication terminal 200, indicating that the call by communication terminal 200 has stopped using communication unit 160. On the other hand, when the call stop information is not acquired, call state detector 115 detects that the call by communication terminal 200 is not stopped. For example, when the call by communication terminal 200 is stopped, communication terminal 200 transmits the call stop information to autonomous travel-type cleaner 100.

The processing of step S20 is continued until call state detector 115 detects that the call by communication terminal 200 has stopped (No in step S20).

When call state detector 115 detects that the call by communication terminal 200 has stopped (Yes in step S20), autonomous travel-type cleaner 100 ends the processing in step S6 (incoming call mode), and performs the processing in step S1, namely, the cleaning in the normal mode again.

Figure 7A:
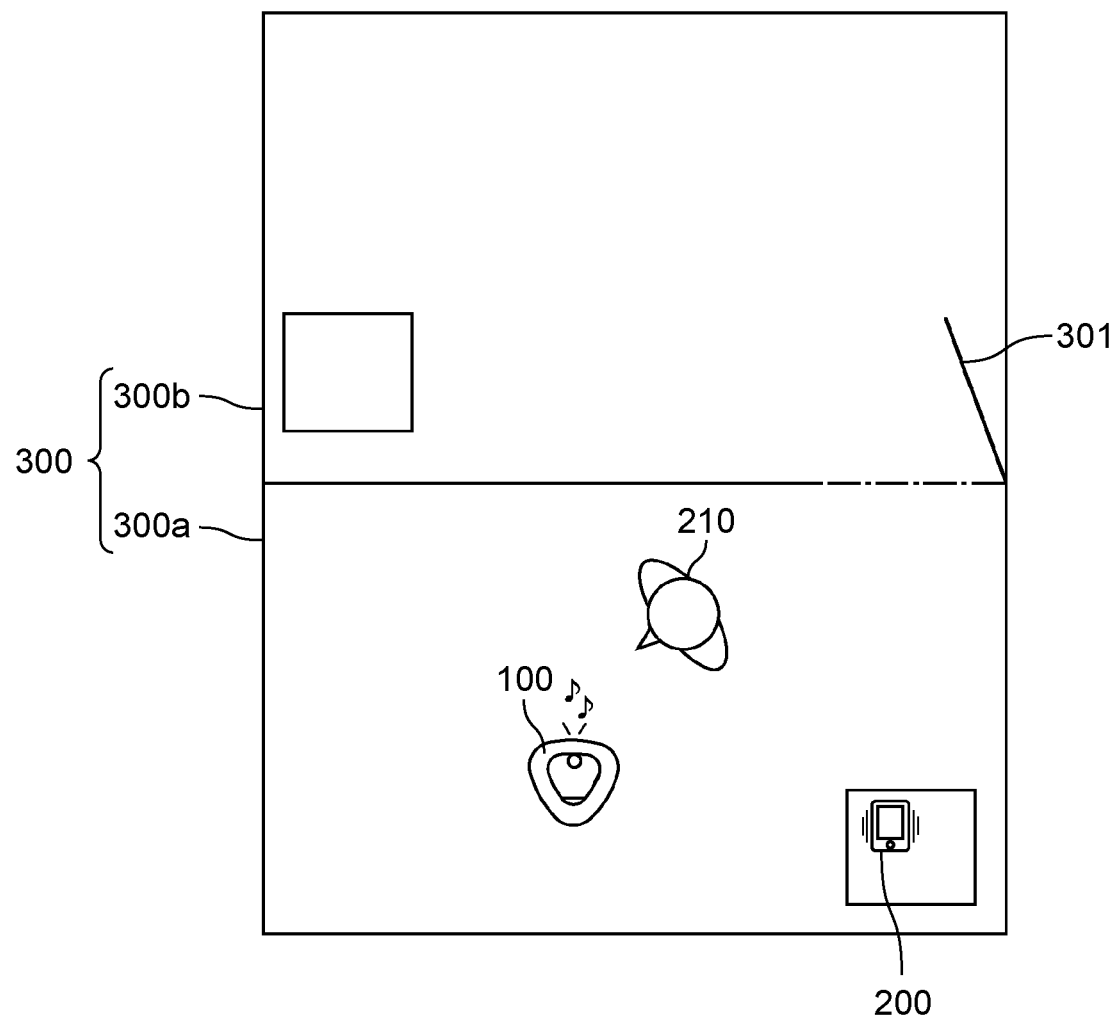
FIG. 7A is a view illustrating a movement of the autonomous travel-type cleaner in Operation Example 2.
Figure 7B:
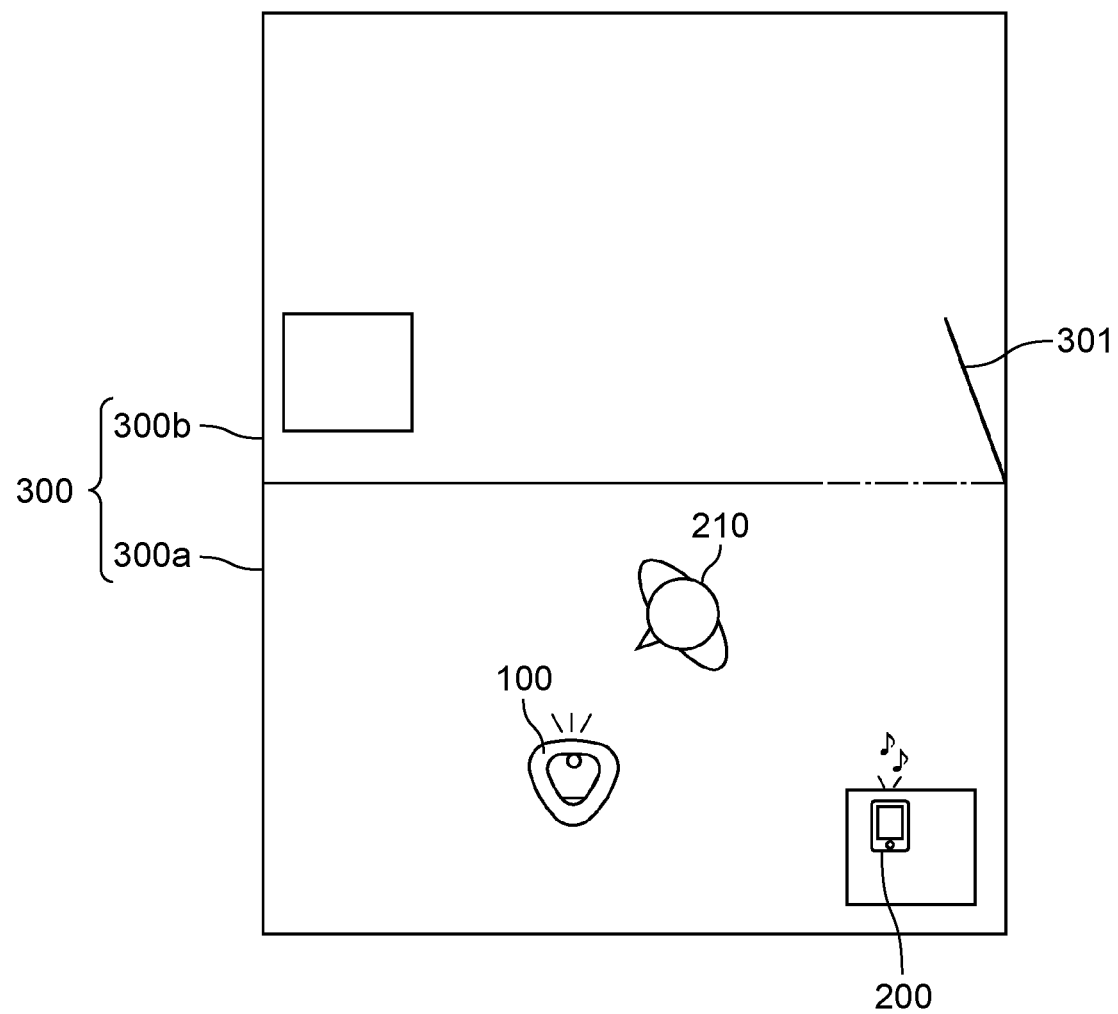
FIG. 7B is another view illustrating a movement of the autonomous travel-type cleaner in Operation Example 2.

FIGS. 7A and 7B are views illustrating movement of autonomous travel-type cleaner 100 in Operation Example 2.

As shown in FIG. 7A, in Operation Example 2, for example, when the incoming call notifying mode of communication terminal 200 is the manner mode, controller 117 causes speaker 90 to output a sound.

As described above, when (i) incoming call detector 111 detects presence of an incoming call and (ii) the incoming call notifying mode detected by incoming call notifying mode detector 113 is not a mode in which communication terminal 200 notifies of the incoming call in a form of outputting a sound, controller 117 causes the incoming call notification unit to notify of presence of an incoming call in a form of outputting a sound.

Accordingly, when there is an incoming call to communication terminal 200, communication terminal 200 does not perform notification in a form of outputting a sound, but autonomous travel-type cleaner 100 performs notification in a form of outputting a sound. Therefore, the notification of presence of an incoming call can easily reach far, and autonomous travel-type cleaner 100 can make person 210 easily notice presence of an incoming call to communication terminal 200.

Further, as illustrated in FIG. 7B, in Operation Example 2, controller 117 causes light source 80 to emit light, for example, in a case where the incoming call notifying mode of communication terminal 200 is a mode of notifying in a form of outputting a sound.

As described above, when (i) incoming call detector 111 detects presence of an incoming call, and (ii) the incoming call notifying mode detected by incoming call notifying mode detector 113 is a mode in which communication terminal 200 notifies of an incoming call in a form of outputting a sound, controller 117 causes the incoming call notification unit to notify of presence of an incoming call in a form of not outputting a sound.

Accordingly, when there is an incoming call to communication terminal 200, communication terminal 200 performs notification in a form of outputting a sound, whereas autonomous travel-type cleaner 100 performs notification in a form of not outputting a sound. Therefore, since autonomous travel-type cleaner 100 notifies of the incoming call in a form different from that of communication terminal 200, it is possible to make person 210 easily notice presence of an incoming call to communication terminal 200.

Operation Example 3

Figure 8:
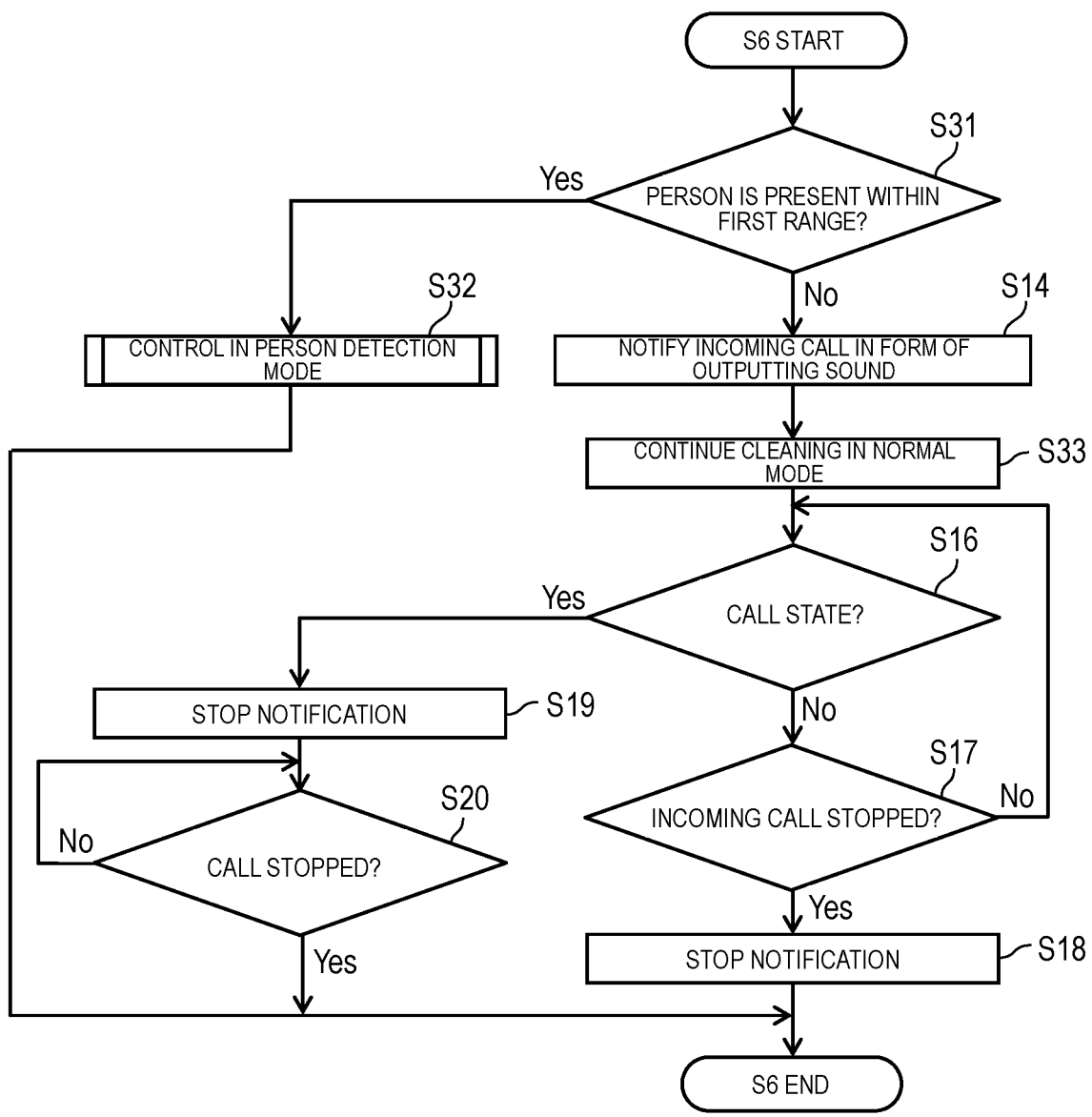
FIG. 8 is a flowchart illustrating a processing procedure in Operation Example 3 of the autonomous travel-type cleaner according to the exemplary embodiment.

Next, Operation Example 3, which is a second example of the processing procedure of the control in the incoming call mode in step S6 of Operation Example 1, will be described. FIG. 8 is a flowchart illustrating a processing procedure in Operation Example 3 of autonomous travel-type cleaner 100 according to the exemplary embodiment. Operation Example 3 is an operation example when it is not determined whether or not the incoming call notifying mode detected by incoming call notifying mode detector 113 is a mode in which communication terminal 200 performs notification by sound. Therefore, when the process of Operation Example 3 is performed, step S5 in Operation Example 1 may not be performed.

As illustrated in FIG. 8, first, person detector 112 detects whether or not person 210 is present within the first range (step S31). For example, person detector 112 detects whether or not person 210 is present within the first range based on the sensor data periodically acquired by the processing in step S2 of Operation Example 1. The sensor data may not be the sensor data periodically acquired by the processing of step S2, and may be, for example, the sensor data acquired immediately before step S31.

Specifically, when the sensor data is a plurality of pieces of polar coordinate data obtained by scanning with laser range finder 40, first, person detector 112 converts each of the plurality of pieces of polar coordinate data into absolute coordinate data in the map information. Person detector 112 clusters the plurality of pieces of converted absolute coordinate data into a plurality of pieces of point group data in which pieces of data having close coordinates are set as a subset. For example, when there is point group data whose position changes with time among the plurality of pieces of point group data, person detector 112 determines that the point group data is point group data indicating a person. In addition, when the plurality of pieces of point group data include point group data having a human shape (for example, the shape of a human leg) pattern, person detector 112 may determine that the point group data is the point group data indicating person 210. When the point group data indicating person 210 is located within the first range, person detector 112 detects that person 210 is present within the first range.

Furthermore, in a case where the sensor data is an image captured by camera 60, person detector 112 performs image analysis on the acquired image using a convolution neural network (CNN) method or the like, and determines whether or not person 210 is included in the image. When person 210 is included in the image obtained by photographing the inside of the first range, person detector 112 detects that person 210 is present within the first range. Further, the sensor data may include data indicating a distance between person 210 and autonomous travel-type cleaner 100 acquired from laser range finder 40 or depth sensor 70. Person detector 112 may detect whether or not person 210 is present within the first range by combining the image captured by camera 60 and the data indicating the distance.

Note that, the method of detecting person 210 is an example, and the method of detecting person 210 by person detector 112 is not particularly limited.

The first range is a range around autonomous travel-type cleaner 100 where person 210 present in the first range can recognize autonomous travel-type cleaner 100. That is, when person 210 is present in the first range, a distance between person 210 and autonomous travel-type cleaner 100 is short. The first range is defined by, for example, absolute coordinates in map information. The first range is, for example, a range based on cleaning area 300 that is an area autonomously cleaned by autonomous travel-type cleaner 100. The range based on cleaning area 300 is, for example, sub-area 300a or 300b where autonomous travel-type cleaner 100 is located. Further, the range based on cleaning area 300 may be a range where autonomous travel-type cleaner 100 travels and cleaning is completed in cleaning area 300 or sub-area 300a or 300b where autonomous travel-type cleaner 100 is located.

In addition, the first range may be a range based on the position of autonomous travel-type cleaner 100. The range based on the position of autonomous travel-type cleaner 100 is, for example, a scan range of laser range finder 40 or a range in which an image that can be recognized by a person can be captured by camera 60. Specifically, the range based on the position of autonomous travel-type cleaner 100 is, for example, a range surrounded by a position to a shorter distance of a predetermined distance from the position of autonomous travel-type cleaner 100 and a distance from the position of autonomous travel-type cleaner 100 to an obstacle such as a wall. The predetermined distance is set depending on detection ranges of various sensors and the like, and is, for example, less than or equal to 8 m.

The first range may be set to any one of the ranges described above in advance, or may be set by the user.

When person detector 112 detects that person 210 is present within the first range (Yes in step S31), autonomous travel-type cleaner 100 performs control in a person detection mode (step S32). Thereafter, autonomous travel-type cleaner 100 ends the processing in step S5 (incoming call mode), and performs the processing in step S1, namely, the cleaning in the normal mode again. Details of the person detection mode (step S32) will be described later. On the other hand, when person detector 112 detects that person 210 is not present within the first range (No in step S31), controller 117 causes the incoming call notification unit to notify of presence of an incoming call to communication terminal 200 in a form of outputting a sound (step S14). Then, autonomous travel-type cleaner 100 continues the cleaning in the normal mode (step S33). As described above, autonomous travel-type cleaner 100 continues the cleaning in the normal mode and does not stop the cleaning unnecessarily when person 210 is not present within the first range and hardly disturbs the call of person 210.

After step S33, autonomous travel-type cleaner 100 performs processing similar to the processing after step S16 in Operation Example 2. Then, autonomous travel-type cleaner 100 ends the processing in step S6 (incoming call mode), and performs the processing in step S1, namely, the cleaning in the normal mode again.

Figure 9:
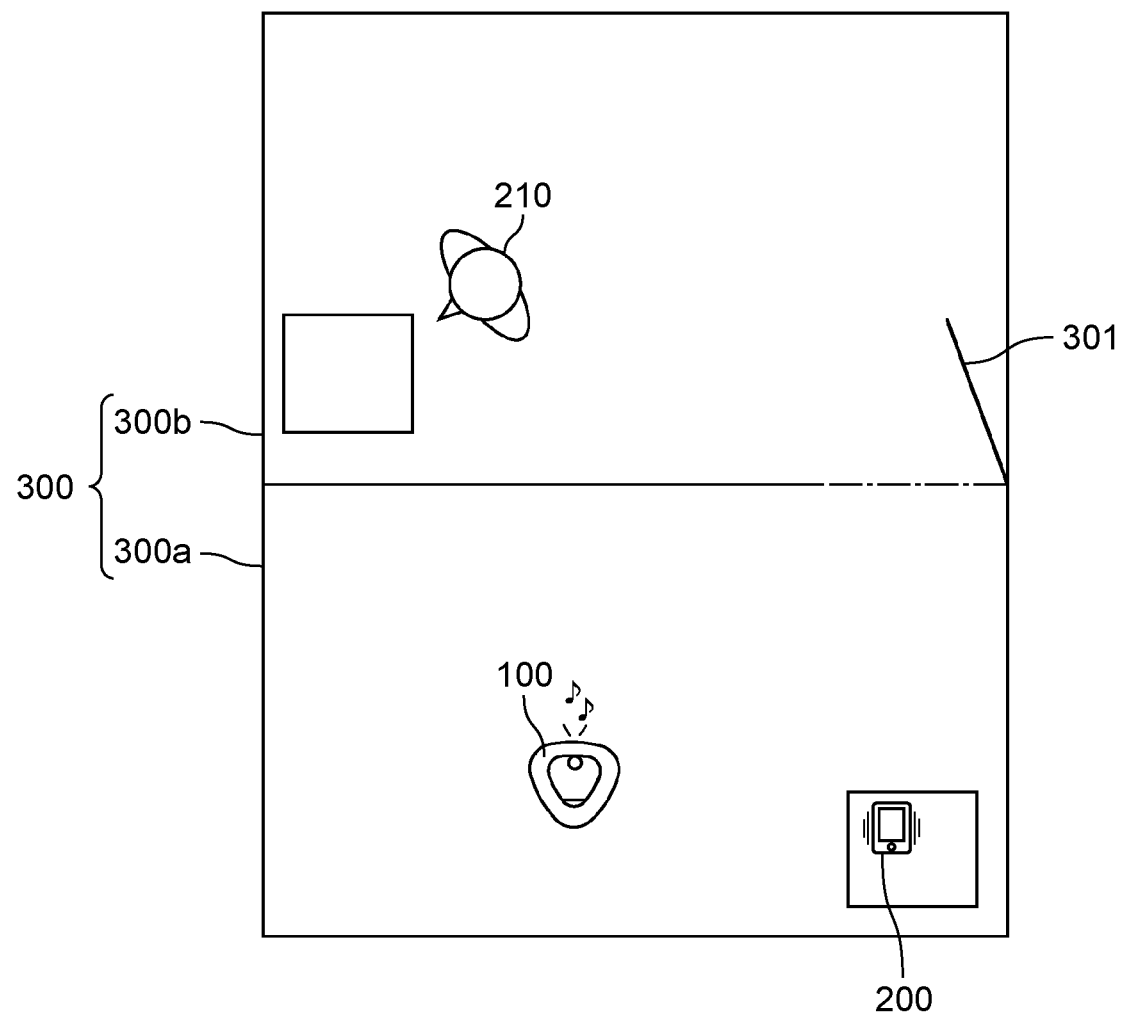
FIG. 9 is a view showing a movement of the autonomous travel-type cleaner in Operation Example 3.

FIG. 9 is a view showing a movement of autonomous travel-type cleaner 100 in Operation Example 3.

As shown in FIG. 9, in Operation Example 3, for example, when person 210 and autonomous travel-type cleaner 100 are relatively far from each other, controller 117 causes the incoming call notification unit to notify of presence of an incoming call.

As described above, when (i) incoming call detector 111 detects presence of an incoming call, and (ii) person detector 112 detects that person 210 is not present within the first range, controller 117 causes the incoming call notification unit to notify of presence of an incoming call.

Accordingly, even when person 210 is not present within the first range and is far from autonomous travel-type cleaner 100, autonomous travel-type cleaner 100 notifies and attracts attention of person 210, so that person 210 can easily notice presence of an incoming call to communication terminal 200. In particular, in the case where autonomous travel-type cleaner 100 performs notification in a form of outputting a sound, the notification easily reaches a far place, and person 210 can more easily notice presence of an incoming call to communication terminal 200.

When person detector 112 detects that person 210 is not present within the first range (No in step S31), and the first range is the entire area of cleaning area 300, namely, when person 210 is not present in cleaning area 300, controller 117 may determine that person 210 is absent at the house or the like, and perform control to cause the incoming call notification unit not to notify of presence of an incoming call.

Operation Example 4

Figure 10:
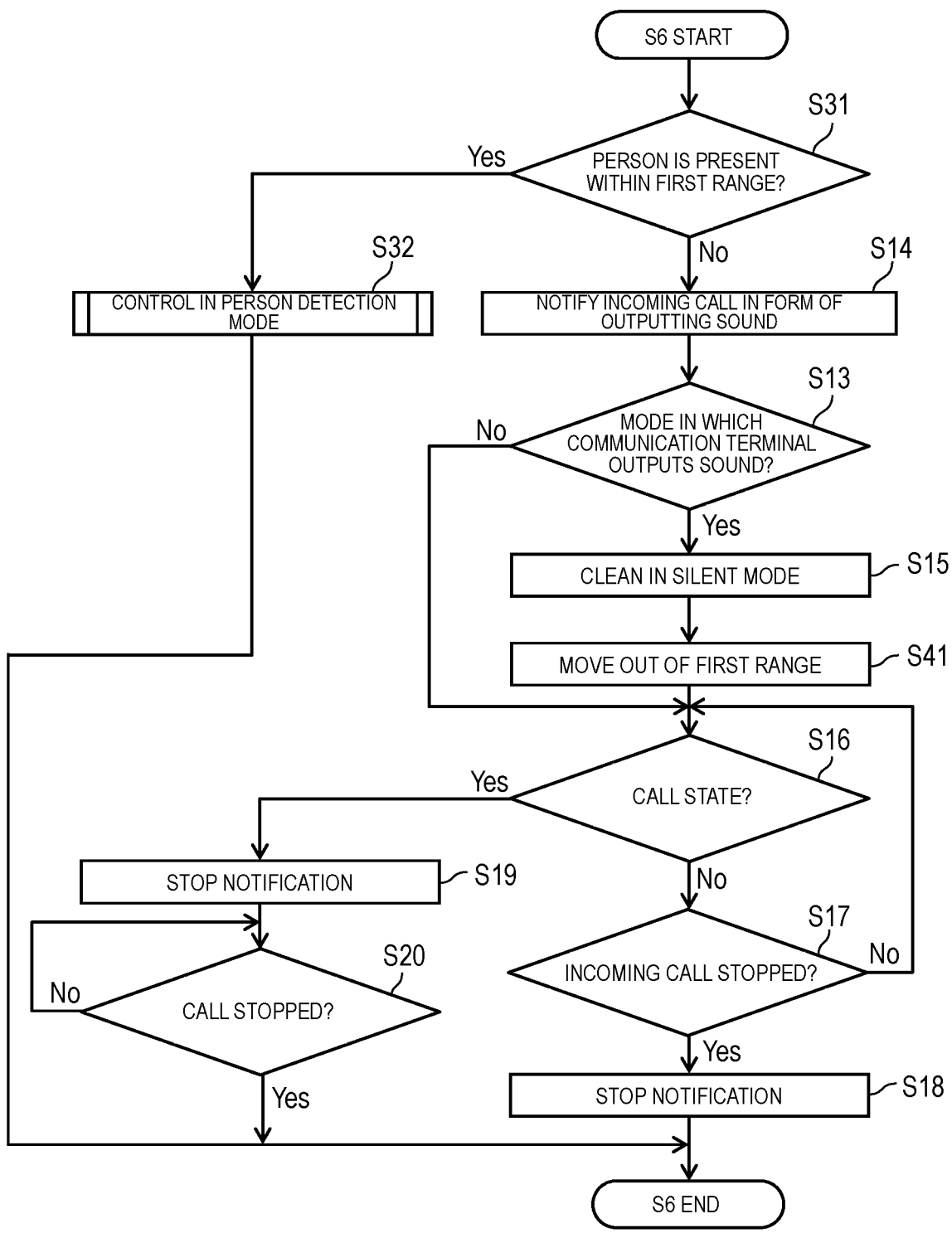
FIG. 10 is a flowchart illustrating a processing procedure in Operation Example 4 of the autonomous travel-type cleaner according to the exemplary embodiment.

Next, Operation Example 4, which is a third example of the processing procedure of the control in the incoming call mode in step S6 of Operation Example 1, will be described. FIG. 10 is a flowchart illustrating a processing procedure in Operation Example 4 of autonomous travel-type cleaner 100 according to the exemplary embodiment.

As illustrated in FIG. 10, first, similarly to Operation Example 3, person detector 112 detects whether or not person 210 is present within the first range (step S31). When person detector 112 detects that person 210 is present within the first range (Yes in step S31), autonomous travel-type cleaner 100 performs control in a person detection mode (step S32). Thereafter, autonomous travel-type cleaner 100 ends the processing in step S6 (incoming call mode), and performs the processing in step S1, namely, the cleaning in the normal mode again.

On the other hand, when person detector 112 detects that person 210 is not present within the first range (No in step S31), controller 117 causes the incoming call notification unit to notify of presence of an incoming call to communication terminal 200 in a form of outputting a sound (step S14). In Operation Example 4, regardless of whether or not the incoming call notifying mode detected by incoming call notifying mode detector 113 is a mode in which communication terminal 200 performs notification in a form of outputting a sound, controller 117 causes the incoming call notification unit to notify of presence of an incoming call to communication terminal 200 in a form of outputting a sound.

Next, controller 117 determines whether or not the incoming call notifying mode detected by incoming call notifying mode detector 113 in step S5 described above is a mode in which communication terminal 200 performs notification in a form of outputting a sound (step S13).

When controller 117 determines that the detected incoming call notifying mode is a mode in which communication terminal 200 performs notification in a form of outputting a sound (Yes in step S13), autonomous travel-type cleaner 100 performs cleaning in the silent mode while continuing the notification (step S15). Then, controller 117 controls drive unit 140 to move housing 10 out of the first range (step S41). For example, controller 117 controls drive unit 140 to move housing 10 to a region outside the first range in cleaning area 300. As a result, autonomous travel-type cleaner 100 performs an operation of searching for person 210 out of the first range where person 210 is not detected. Further, controller 117 moves housing 10 while continuing to cause the incoming call notification unit to perform notification.

At this time, person detector 112 may continue detecting person 210, and controller 117 may control drive unit 140 to continuously move housing 10 until person detector 112 detects person 210.

On the other hand, when controller 117 determines that the detected incoming call notifying mode is not a mode in which communication terminal 200 performs notification by sound (No in step S13), autonomous travel-type cleaner 100 skips the processing in steps S15 and S41.

After No in step S41 or step S13, autonomous travel-type cleaner 100 performs processing similar to the processing after step S16 in Operation Example 2. Then, autonomous travel-type cleaner 100 ends the processing in step S6 (incoming call mode), and performs the processing in step S1, namely, the cleaning in the normal mode again.

Figure 11:
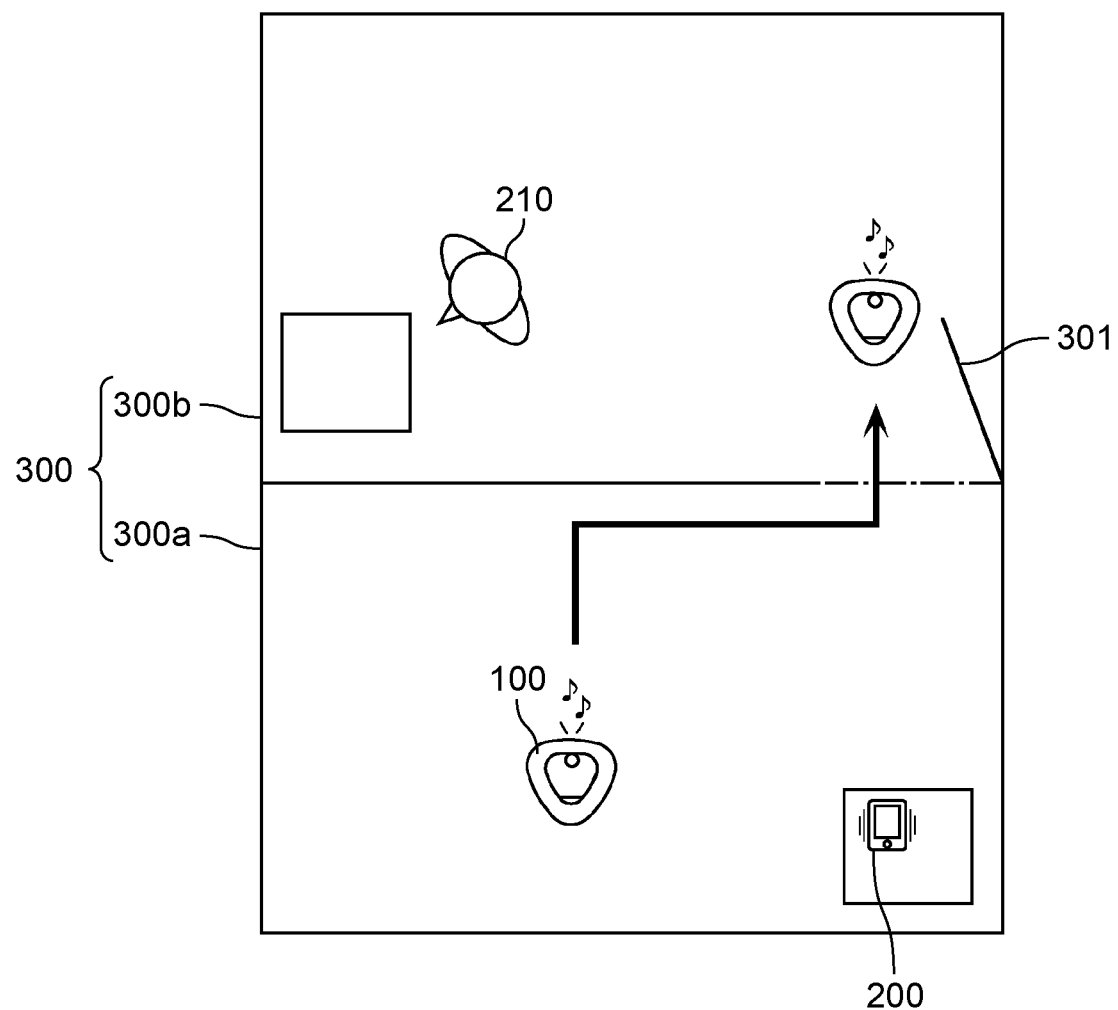
FIG. 11 is a view illustrating a movement of the autonomous travel-type cleaner in Operation Example 4.

FIG. 11 is a view showing a movement of autonomous travel-type cleaner 100 in Operation Example 4.

As shown in FIG. 11, in Operation Example 4, for example, controller 117 causes speaker 90 to output a sound when person 210 and autonomous travel-type cleaner 100 are relatively far from each other.

As described above, when (i) incoming call detector 111 detects presence of an incoming call, and (ii) person detector 112 detects that person 210 is not present within the first range, controller 117 causes the incoming call notification unit to notify of presence of an incoming call in a form of outputting a sound regardless of whether or not the incoming call notifying mode detected by incoming call notifying mode detector 113 is a mode in which communication terminal 200 performs notification in a form of outputting a sound.

As a result, even when person 210 is not present within the first range and is far from autonomous travel-type cleaner 100, autonomous travel-type cleaner 100 performs notification in a form of outputting a sound to attract attention of person 210. Therefore, the notification can easily reach far, and person 210 can easily notice presence of an incoming call to communication terminal 200.

Further, as shown in FIG. 11, for example, when the first range where person 210 is not present is a range of sub-area 300*a*, autonomous travel-type cleaner 100 goes out of sub-area 300*a* and moves to sub-area 300*b* different from sub-area 300*a*.

As described above, when (i) incoming call detector 111 detects presence of an incoming call, and (ii) person detector 112 detects that person 210 is not present within the first range, controller 117 controls drive unit 140 to move housing 10 out of the first range. Further, when (i) incoming call detector 111 detects presence of an incoming call, (ii) the incoming call notifying mode detected by incoming call notifying mode detector 113 is a mode in which communication terminal 200 notifies of the incoming call in a form of outputting a sound, and (iii) person detector 112 detects that person 210 is not present within the first range, controller 117 controls drive unit 140 to move housing 10 out of the first range.

Accordingly, even when person 210 is not present within the first range and is far from autonomous travel-type cleaner 100, autonomous travel-type cleaner 100 moves out of the first range and travels so as to search for person 210. Therefore, autonomous travel-type cleaner 100 can move to an area where person 210 is likely to be present and notify of presence of an incoming call, so that person 210 can easily notice presence of an incoming call to communication terminal 200.

Note that, in Operation Example 4, the processing of step S13 may not be performed, and the processing of step S15 and subsequent steps may be performed regardless of whether or not the incoming call notifying mode of communication terminal 200 is a mode in which communication terminal 200 performs notification in a form of outputting a sound.

Operation Example 5

Figure 12:
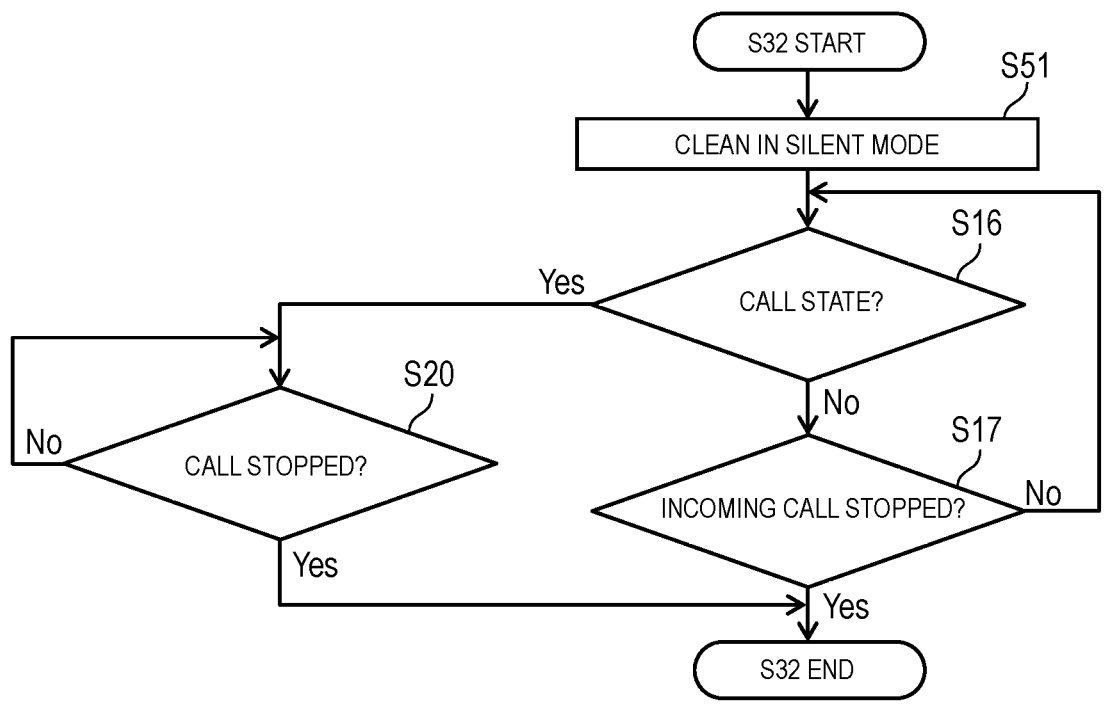
FIG. 12 is a flowchart illustrating a processing procedure in Operation Example 5 of the autonomous travel-type cleaner according to the exemplary embodiment.

Next, Operation Example 5, which is a first example of a processing procedure of control in the person detection mode in step S32 of Operation Example 3 or Operation Example 4, will be described. Operation Example 5 may be combined with either Operation Example 3 or Operation Example 4. FIG. 12 is a flowchart showing a processing procedure in Operation Example 5 of autonomous travel-type cleaner 100 according to the exemplary embodiment. Further, Operation Example 5 is an operation example when it is not determined whether or not the incoming call notifying mode detected by incoming call notifying mode detector 113 is a mode in which communication terminal 200 performs notification by sound. Therefore, when the process of Operation Example 5 is performed, step S5 in Operation Example 1 may not be performed.

As shown in FIG. 12, first, autonomous travel-type cleaner 100 performs cleaning in the silent mode without notifying of presence of an incoming call to communication terminal 200 (step S51). Note that, in step S51, autonomous travel-type cleaner 100 may stop the cleaning instead of performing the cleaning in the silent mode. Further, in step S51, controller 117 may control drive unit 140 to temporarily move autonomous travel-type cleaner 100 to a predetermined position such as a charger (not shown).

Next, call state detector 115 detects whether or not communication terminal 200 is in a call state (step S16). When call state detector 115 detects that communication terminal 200 is not in the call state (No in step S16), incoming call detector 111 detects whether or not the incoming call to communication terminal 200 is stopped (step S17).

When incoming call detector 111 detects that the incoming call to communication terminal 200 is stopped (Yes in step S17), autonomous travel-type cleaner 100 ends the processing in step S32 (person detection mode), and performs the processing in step S1, namely, the cleaning in the normal mode again.

On the other hand, when incoming call detector 111 detects that the incoming call to communication terminal 200 is not stopped (No in step S17), autonomous travel-type cleaner 100 returns the processing to step S16, and continues the detection of the call state until the incoming call to communication terminal 200 is stopped.

When detecting that communication terminal 200 is in the call state (Yes in step S16), call state detector 115 detects whether or not the call by communication terminal 200 is stopped (step S20). The processing of step S20 is continued until call state detector 115 detects that the call by communication terminal 200 has stopped (No in step S20).

When call state detector 115 detects that the call by communication terminal 200 is stopped (Yes in step S20), autonomous travel-type cleaner 100 ends the processing in step S32 (person detection mode), and performs the processing in step S1, namely, the cleaning in the normal mode again.

As described above, in Operation Example 5, when (i) incoming call detector 111 detects presence of an incoming call, and (ii) person detector 112 detects that person 210 is present within the first range, controller 117 controls to reduce the cleaning sound of autonomous travel-type cleaner 100. Accordingly, when person 210 is present within the first range and is close to autonomous travel-type cleaner 100, autonomous travel-type cleaner 100 can reduce a cleaning sound to make it easy for person 210 to notice notification of an incoming call of communication terminal 200 itself. In this case, controller 117 does not cause the incoming call notification unit to perform notification. Therefore, since communication terminal 200 and autonomous travel-type cleaner 100 do not make double notification, person 210 is prevented from feeling uncomfortable.

Note that, in Operation Example 5, not only when presence of an incoming call to communication terminal 200 is detected in step S4, but also when call origination by communication terminal 200 is detected instead of the incoming call being detected by incoming call detector 111, the process in which the incoming call is replaced with the call origination may be performed.

Operation Example 6

Figure 13:
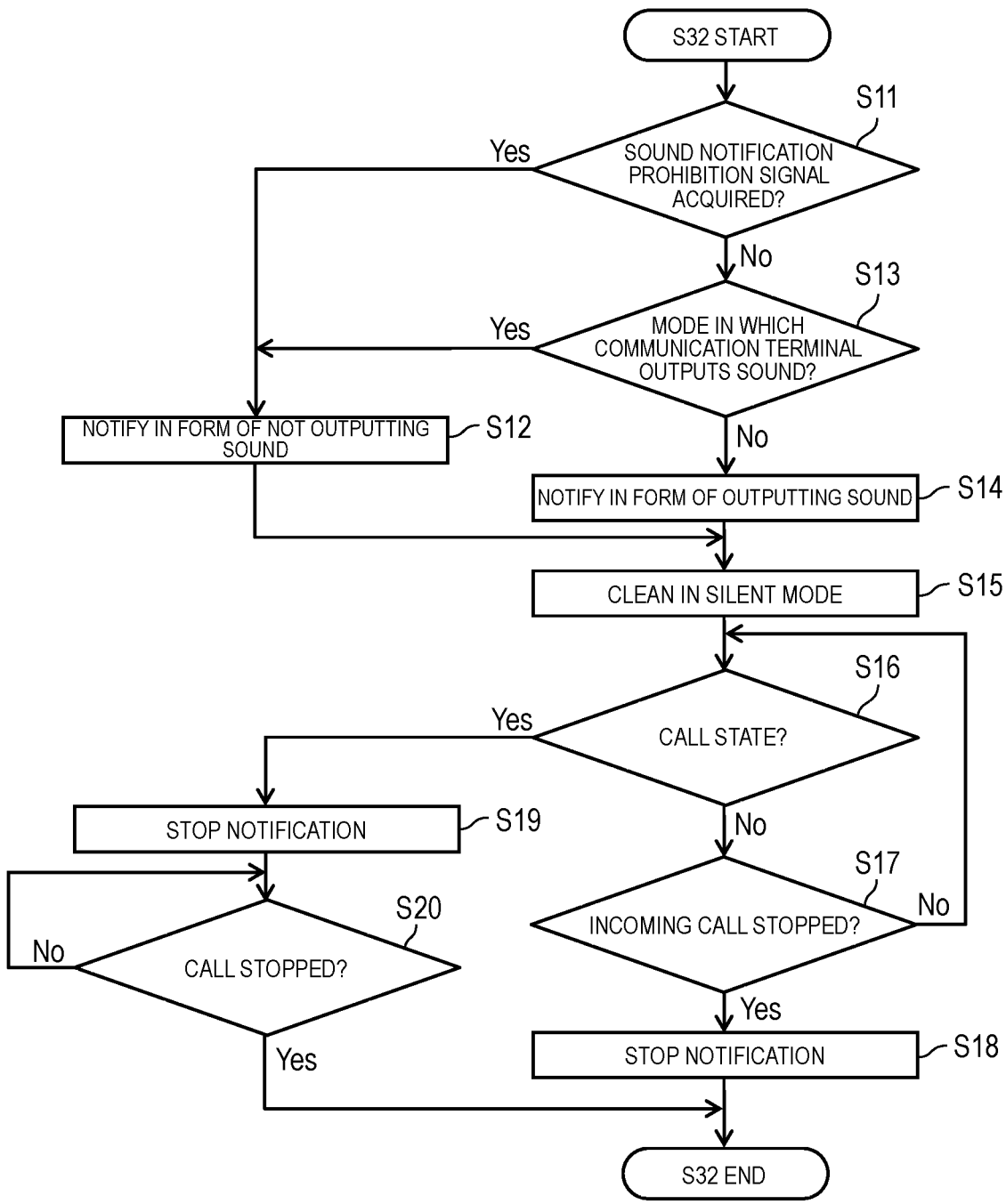
FIG. 13 is a flowchart illustrating a processing procedure in Operation Example 6 of the autonomous travel-type cleaner according to the exemplary embodiment.

Next, Operation Example 6, which is a second example of the processing procedure of the control in the person detection mode in step S32 of Operation Example 3 or Operation Example 4, will be described. Operation Example 6 may be combined with either Operation Example 3 or Operation Example 4. FIG. 13 is a flowchart showing a processing procedure in Operation Example 6 of autonomous travel-type cleaner 100 according to the exemplary embodiment.

As shown in FIG. 13, in Operation Example 6, autonomous travel-type cleaner 100 performs processing similar to the processing in Operation Example 2. Autonomous travel-type cleaner 100 performs the operation shown in FIG. 7A or 7B described above, for example. As described above, even when person detector 112 detects that person 210 is present within the first range, autonomous travel-type cleaner 100 notifies of presence of an incoming call in a form corresponding to the incoming call notifying mode of communication terminal 200 in order to make it easy for person 210 to notice presence of an incoming call.

Operation Example 7

Figure 14:
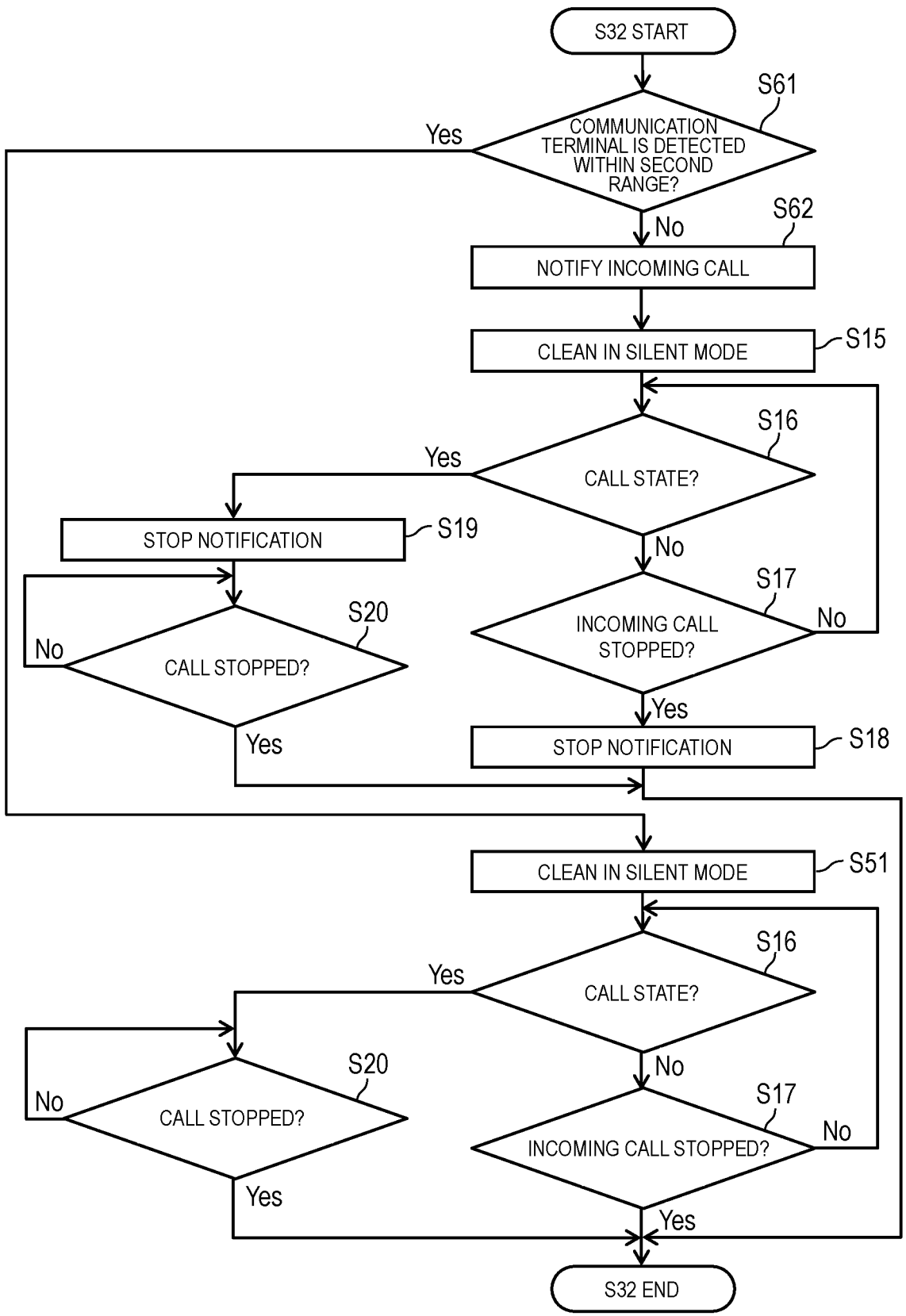
FIG. 14 is a flowchart illustrating a processing procedure in Operation Example 7 of the autonomous travel-type cleaner according to the exemplary embodiment.

Next, Operation Example 7, which is a third example of the processing procedure of the control in the person detection mode in step S32 of Operation Example 3 or Operation Example 4, will be described. Operation Example 7 may be combined with either Operation Example 3 or Operation Example 4. FIG. 14 is a flowchart showing a processing procedure in Operation Example 7 of autonomous travel-type cleaner 100 according to the exemplary embodiment. Operation Example 7 is an operation example in a case where it is not determined whether or not the incoming call notifying mode detected by incoming call notifying mode detector 113 is a mode in which communication terminal 200 performs notification by sound. Therefore, when the process of Operation Example 7 is performed, step S5 in Operation Example 1 may not be performed.

As illustrated in FIG. 14, first, communication terminal detector 114 detects whether or not communication terminal 200 is present within the second range (step S61). Communication terminal detector 114, for example, acquires distance information indicating a distance between autonomous travel-type cleaner 100 and communication terminal 200 using communication unit 160, and detects whether or not communication terminal 200 is present within the second range based on the acquired distance information.

Specifically, while autonomous travel-type cleaner 100 is performing cleaning, communication terminal detector 114 periodically transmits a beacon using communication unit 160, and communication terminal 200 receives the transmitted beacon. The beacon includes information indicating transmission strength (for example, TXPower: a reference reception strength value at the time of reception at a distance of 1 m), and communication terminal 200 calculates a distance between autonomous travel-type cleaner 100 and communication terminal 200 based on a relationship between the transmission strength indicated by the information of the beacon and a reception strength of the received beacon. For example, communication terminal 200 generates distance information indicating the calculated distance, and transmits the distance information and the incoming call information described in the description of step S4 together to autonomous travel-type cleaner 100. Furthermore, communication terminal detector 114 may transmit a beacon immediately before performing the processing of step S61, and distance information based on the beacon may be transmitted from communication terminal 200. From the viewpoint that the distance between autonomous travel-type cleaner 100 and communication terminal 200 can be easily determined, communication terminal detector 114 communicates with communication terminal 200 by Bluetooth, for example.

The second range is a range around autonomous travel-type cleaner 100 in which communication terminal 200 present in the second range can be recognized by person 210 when person 210 is present at the position of autonomous travel-type cleaner 100. That is, when communication terminal 200 is present in the second range, the distance between person 210 and communication terminal 200 is short. The second range is defined by, for example, absolute coordinates in the map information. The second range is, for example, a range in which the distance from autonomous travel-type cleaner 100 is a predetermined distance or less. The predetermined distance is, for example, a distance at which a reception strength of a beacon transmitted from autonomous travel-type cleaner 100 is equal to or higher than a predetermined strength. The predetermined strength is set depending on, for example, a use environment or the like. In addition, the second range may be the same range as the first range.

When communication terminal detector 114 detects that communication terminal 200 is present within the second range (Yes in step S61), autonomous travel-type cleaner 100 performs processing in and after step S51 similarly to Operation Example 5. Then, autonomous travel-type cleaner 100 ends the processing in step S32 (person detection mode), and performs the processing in step S1, namely, the cleaning in the normal mode again.

On the other hand, when communication terminal detector 114 detects that communication terminal 200 is not present within the second range (No in step S61), controller 117 causes the incoming call notification unit to notify of presence of an incoming call to communication terminal 200 (step S62). In step S62, controller 117 may cause the incoming call notification unit to notify of presence of an incoming call in a form of not outputting a sound as in step S12, or may cause the incoming call notification unit to notify of presence of an incoming call in a form of outputting a sound as in step S14.

After step S62, autonomous travel-type cleaner 100 performs processing similar to the processing in and after step S15 in Operation Example 2. Then, autonomous travel-type cleaner 100 ends the processing in step S32 (person detection mode), and performs the processing in step S1, namely, the cleaning in the normal mode again.

Figure 15A:
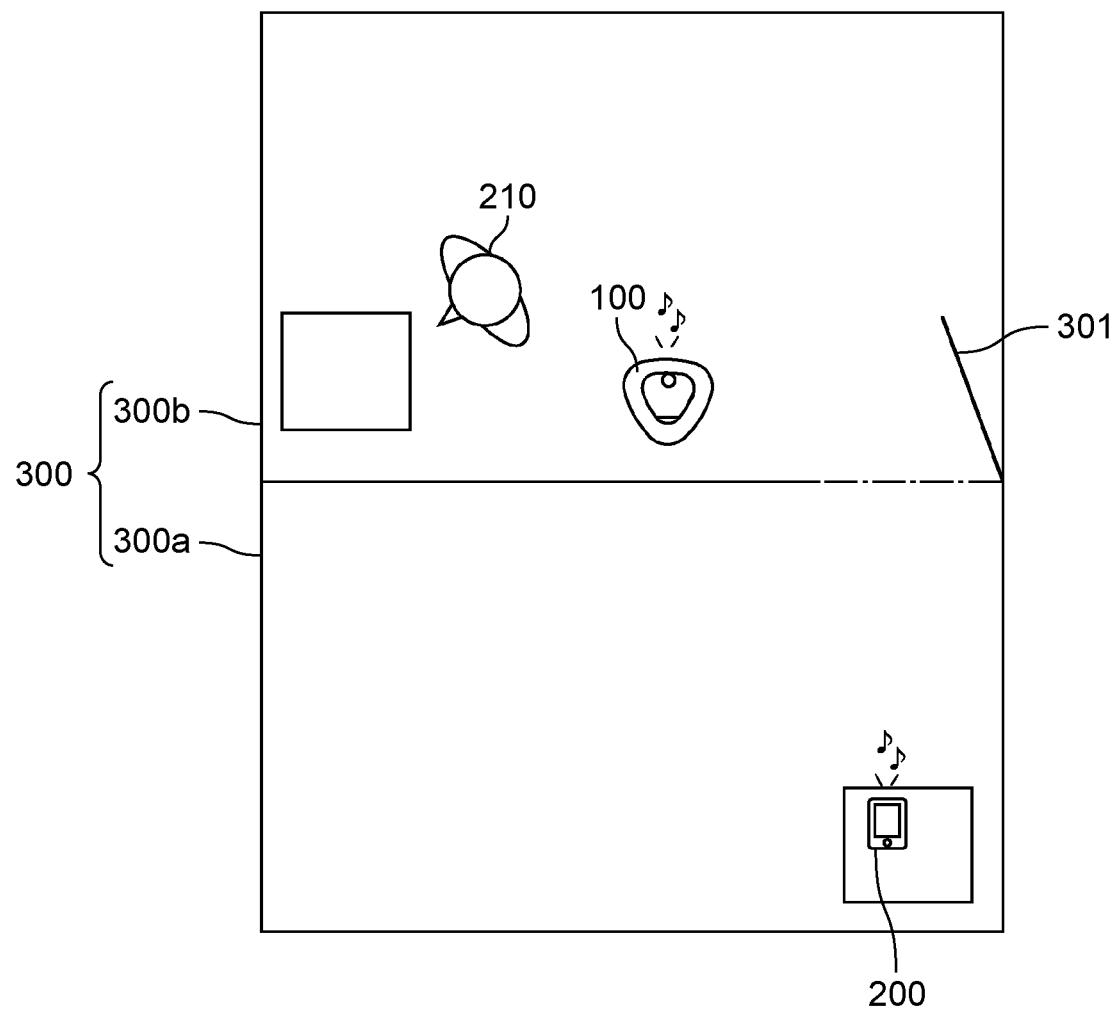
FIG. 15A is a view illustrating a movement of the autonomous travel-type cleaner in Operation Example 7.
Figure 15B:
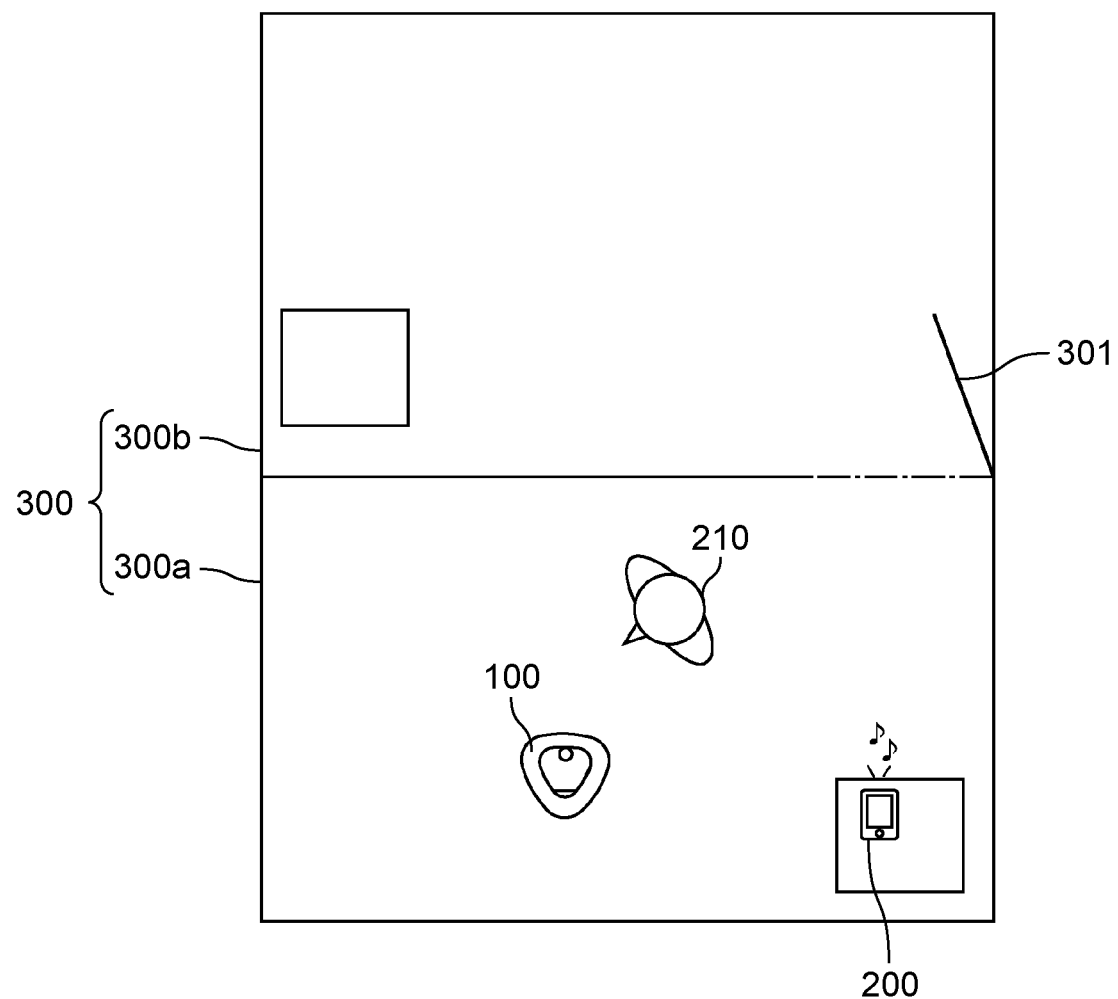
FIG. 15B is another view illustrating a movement of the autonomous travel-type cleaner in Operation Example 7.

FIGS. 15A and 15B are views showing a movement of autonomous travel-type cleaner 100 in Operation Example 7.

As shown in FIG. 15A, in Operation Example 7, for example, when person 210 and autonomous travel-type cleaner 100 are relatively close to each other and person 210 and communication terminal 200 are relatively far from each other, controller 117 causes the incoming call notification unit to notify of presence of an incoming call.

As described above, when (i) incoming call detector 111 detects presence of an incoming call, (ii) person detector 112 detects that person 210 is present within the first range, and (iii) communication terminal detector 114 detects that communication terminal 200 is not present within the second range, controller 117 causes the incoming call notification unit to notify of presence of an incoming call.

Accordingly, when person 210 is present within the first range and is close to autonomous travel-type cleaner 100, and when communication terminal 200 is not present within the second range and is far from autonomous travel-type cleaner 100, autonomous travel-type cleaner 100 notifies of an incoming call. In this case, there is a high possibility that person 210 is present at a position far from communication terminal 200. Therefore, autonomous travel-type cleaner 100 present near person 210 notifies of presence of an incoming call to communication terminal 200, so that person 210 can more easily notice presence of an incoming call to communication terminal 200.

In addition, as shown in FIG. 15B, for example, when person 210, autonomous travel-type cleaner 100, and communication terminal 200 are relatively close to each other, controller 117 performs control such that autonomous travel-type cleaner 100 cleans in the silent mode without causing the incoming call notification unit to notify of presence of an incoming call.

As described above, when (i) incoming call detector 111 detects presence of an incoming call, (ii) person detector 112 detects that person 210 is present within the first range, and (iii) communication terminal detector 114 detects that communication terminal 200 is present within the second range, controller 117 performs control so as to reduce a cleaning sound by autonomous travel-type cleaner 100.

Accordingly, when person 210 is present within the first range, communication terminal 200 is present within the second range, and both person 210 and communication terminal 200 are close to autonomous travel-type cleaner 100, autonomous travel-type cleaner 100 can reduce the cleaning sound to make it easy for person 210 to notice notification of the incoming call of communication terminal 200 itself. In this case, controller 117 does not cause the incoming call notification unit to perform notification. Therefore, since communication terminal 200 and autonomous travel-type cleaner 100 do not make double notification, person 210 is prevented from feeling uncomfortable.

Operation Example 8

Figure 16:
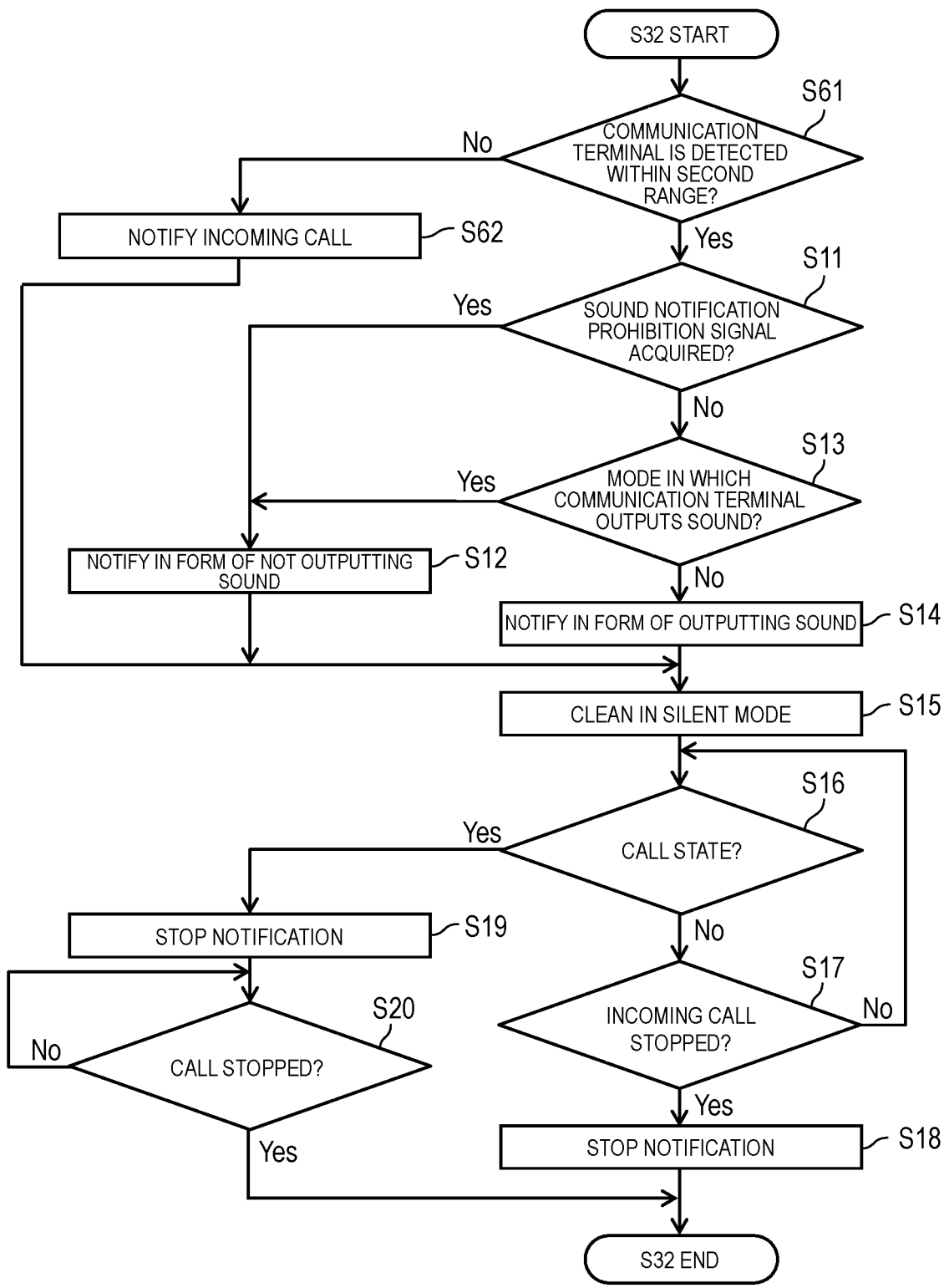
FIG. 16 is a flowchart illustrating a processing procedure in Operation Example 8 of the autonomous travel-type cleaner according to the exemplary embodiment.

Next, Operation Example 8, which is a fourth example of the processing procedure of the control in the person detection mode in step S32 of Operation Example 3 or Operation Example 4, will be described. Operation Example 8 may be combined with either Operation Example 3 or Operation Example 4. FIG. 16 is a flowchart illustrating a processing procedure in Operation Example 8 of autonomous travel-type cleaner 100 according to the exemplary embodiment.

As illustrated in FIG. 16, first, communication terminal detector 114 detects whether or not communication terminal 200 is present within the second range (step S61).

When communication terminal detector 114 detects that communication terminal 200 is not present within the second range (No in step S61), autonomous travel-type cleaner 100 performs processing similar to the processing in and after step S62 in Operation Example 7. Then, autonomous travel-type cleaner 100 ends the processing in step S32 (person detection mode), and performs the processing in step S1, namely, the cleaning in the normal mode again.

On the other hand, when communication terminal detector 114 detects that communication terminal 200 is present within the second range (Yes in step S61), autonomous travel-type cleaner 100 performs processing in and after step S11 similarly to Operation Example 2. Then, autonomous travel-type cleaner 100 ends the processing in step S32 (person detection mode), and performs the processing in step S1, namely, the cleaning in the normal mode again.

[Summary]

As described above, autonomous travel-type cleaner 100 includes: incoming call detector 111 which detects whether or not there is an incoming call to communication terminal 200; person detector 112 which detects whether or not person 210 is present within the first range; the incoming call notification unit (for example, light source 80 and speaker 90) for notifying of presence of an incoming call; and controller 117. Controller 117 controls the notification operation of the incoming call notification unit based on the detection result of person detector 112 and the detection result of incoming call detector 111.

Accordingly, when there is an incoming call to communication terminal 200, autonomous travel-type cleaner 100 controls an appropriate notification operation depending on whether or not person 210 is present within the first range, that is, whether or not person 210 is present near autonomous travel-type cleaner 100, so that person 210 can easily notice presence of an incoming call to communication terminal 200.

In addition, the control method executed by a computer or the like that controls autonomous travel-type cleaner 100 includes: an incoming call detection step (step S4) of detecting whether or not there is an incoming call to communication terminal 200; a person detection step (step S31) of detecting whether or not person 210 is present within the first range; and a control step (for example, step S14) of controlling a notification operation of an incoming call notification unit for notifying of presence of an incoming call based on a detection result in the person detection step and a detection result in the incoming call detection step.

Also with such a control method, when there is an incoming call to communication terminal 200, person 210 can easily notice presence of an incoming call to communication terminal 200 by appropriately controlling the notification operation depending on whether or not person 210 is present within the first range.

Further, autonomous travel-type cleaner 100 includes: incoming call detector 111 which detects whether there is an incoming call to communication terminal 200; an incoming call notification unit (for example, light source 80 and speaker 90) for notifying of presence of an incoming call; incoming call notifying mode detector 113 which detects an incoming call notifying mode of communication terminal 200; and controller 117. Controller 117 controls the notification operation of the incoming call notification unit based on the detection result of incoming call notifying mode detector 113 and the detection result of incoming call detector 111.

Accordingly, when there is an incoming call to communication terminal 200, autonomous travel-type cleaner 100 controls an appropriate notification operation depending on the incoming call notifying mode of communication terminal 200, so that person 210 can easily notice presence of an incoming call to communication terminal 200.

Further, the control method executed by the computer or the like that controls autonomous travel-type cleaner 100 includes: an incoming call detection step (step S4) of detecting whether or not there is an incoming call to communication terminal 200; an incoming call notifying mode detection step (step S5) of detecting an incoming call notifying mode of communication terminal 200; and a control step (for example, step S12 or step S14) of controlling a notification operation of an incoming call notification unit for notifying of presence of an incoming call based on a detection result in the incoming call notifying mode detection step and a detection result in the incoming call detection step.

Also with such a control method, when there is an incoming call to communication terminal 200, person 210 can easily notice presence of an incoming call to communication terminal 200 by controlling an appropriate notification operation depending on the incoming call notifying mode of communication terminal 200.

Further, autonomous travel-type cleaner 100 includes communication terminal detector 114 which detects whether or not communication terminal 200 is present within the second range. Controller 117 controls the notification operation of the incoming call notification unit based on the detection result of person detector 112, the detection result of incoming call detector 111, and the detection result of communication terminal detector 114. Accordingly, when there is an incoming call to communication terminal 200, autonomous travel-type cleaner 100 controls an appropriate notification operation depending on whether or not person 210 is present within the first range and whether or not communication terminal 200 is present within the second range, so that person 210 can easily notice presence of an incoming call to communication terminal 200.

Further, autonomous travel-type cleaner 100 includes call state detector 115 that detects whether or not communication terminal 200 is in a call state. When call state detector 115 detects that communication terminal 200 is in the call state while controller 117 causes the incoming call notification unit to notify of presence of an incoming call, the controller stops the notification by the incoming call notification unit.

Accordingly, when person 210 makes a call using communication terminal 200, controller 117 stops the notification by the incoming call notification unit. Therefore, autonomous travel-type cleaner 100 can appropriately control the notification without disturbing the call by person 210 by the notification.

[Others]

Note that the present disclosure is not limited to the above embodiment. For example, another exemplary embodiment achieved by arbitrarily combining the components described in the present specification or excluding some of the components may be an exemplary embodiment of the present disclosure. The present disclosure also includes modifications obtained by making various modifications conceivable by those skilled in the art without departing from the spirit of the present disclosure, that is, the meaning indicated by the wording described in the claims.

For example, in Operation Example 2, Operation Example 6, and Operation Example 8 in the above exemplary embodiment, the processing of step S11 may not be performed. In this case, controller 117 does not determine whether or not the sound notification prohibition signal has been acquired, the processing of step S11 is skipped, and the processing of step S13 is performed.

In addition, in Operation Example 2 to Operation Example 8 in the above exemplary embodiment, the processing of step S16 and step S17 may not be performed. In this case, step S16 and step S17 are skipped, and autonomous travel-type cleaner 100 performs the processing of the step subsequent to Yes in step S17, for example, after a predetermined time elapses from the processing of the step before step S16. Alternatively, only step S16 may be skipped, and the processing of step S17 may be performed.

Further, autonomous travel-type cleaner 100 may not include all the constituent elements described in the above exemplary embodiment, and may be configured only by constituent elements for performing a target operation. For example, components not used in each operation example may not be included in autonomous travel-type cleaner 100. Further, autonomous travel-type cleaner 100 may not perform all the operation examples described in the above exemplary embodiment.

In addition, in the above exemplary embodiment, processing executed by a specific processing unit may be executed by another processing unit. Furthermore, the order of a plurality of processes may be changed, or a plurality of processes may be executed in parallel.

In the above exemplary embodiment, each component may be implemented by executing a software program suitable for each component. Each component may be implemented by a program execution unit such as a central processing unit (CPU) or a processor reading and executing a software program recorded in a recording medium such as a hard disk or a semiconductor memory.

In addition, each component may be implemented by hardware. For example, each component may be a circuit (or an integrated circuit). These circuits may constitute one circuit as a whole or may be separate circuits. Each of these circuits may be a general-purpose circuit or a dedicated circuit.

In addition, general or specific aspects of the present disclosure may be implemented by a system, an apparatus, a method, an integrated circuit, a computer program, or a computer-readable recording medium such as a CD-ROM. In addition, the present disclosure may be achieved by an arbitrary combination of a system, an apparatus, a method, an integrated circuit, a computer program, and a recording medium.

When the present disclosure is implemented in a system, the present disclosure may be implemented by a plurality of devices, or may be implemented as a single device. In the case that the system is constructed with the plurality of devices, the components included in the autonomous travel-type cleaner of the exemplary embodiment may be distributed to the plurality of devices in any way.

Furthermore, for example, the present disclosure may be achieved as a control method executed by a computer, or may be achieved as a program for causing a computer to execute such a control method. The present disclosure may be achieved as a computer-readable non-transitory recording medium in which such a program is recorded.

The present disclosure is applicable to an autonomous travel-type cleaner that can autonomously travel.

What is claimed is:

1. An autonomous travel-type cleaner capable of communicating with a communication terminal, the autonomous travel-type cleaner comprising:
   a housing;
   a drive unit that is provided in the housing for moving the housing;
   an incoming call detector that detects whether or not there is an incoming call to the communication terminal;
   a person detector that detects whether or not a person is present within a first range;
   an incoming call notification unit for notifying of presence of the incoming call; and
   a controller, wherein the controller controls a notification operation of the incoming call notification unit based on a detection result of the person detector and a detection result of the incoming call detector.

2. The autonomous travel-type cleaner according to claim 1, wherein when the incoming call detector detects presence of the incoming call, and the person detector detects that the person is not present within the first range, the controller causes the incoming call notification unit to notify of presence of the incoming call.

3. The autonomous travel-type cleaner according to claim 1, wherein when the incoming call detector detects presence of the incoming call, and the person detector detects that the person is not present within the first range, the controller controls the drive unit to move the housing out of the first range.

4. An autonomous travel-type cleaner capable of communicating with a communication terminal, the autonomous travel-type cleaner comprising:
   a housing;
   a drive unit that is provided in the housing for moving the housing;
   an incoming call detector that detects whether or not there is an incoming call to the communication terminal;
   an incoming call notification unit for notifying of presence of the incoming call;
   an incoming call notifying mode detector that detects an incoming call notifying mode of the communication terminal; and
   a controller, wherein the controller controls a notification operation of the incoming call notification unit based on a detection result of the incoming call notifying mode detector and a detection result of the incoming call detector.

5. The autonomous travel-type cleaner according to claim 4, wherein
   the incoming call notification unit notifies of presence of the incoming call in a form of outputting a sound or a form of not outputting a sound, and
   when the incoming call detector detects presence of the incoming call, and the incoming call notifying mode detected by the incoming call notifying mode detector is not a mode in which the communication terminal notifies of the incoming call in a form of outputting a sound, the controller causes the incoming call notification unit to notify of presence of the incoming call in a form of outputting a sound.

6. The autonomous travel-type cleaner according to claim 4, wherein
   the incoming call notification unit notifies of presence of the incoming call in a form of outputting a sound or a form of not outputting a sound, and
   when the incoming call detector detects presence of the incoming call, and the incoming call notifying mode detected by the incoming call notifying mode detector is a mode in which the communication terminal notifies of the incoming call in a form of outputting a sound, the controller causes the incoming call notification unit to notify of presence of the incoming call in a form of not outputting a sound.

7. The autonomous travel-type cleaner according to claim 4, further comprising a person detector that detects whether or not a person is present within a first range, wherein
   the incoming call notification unit notifies of presence of the incoming call in a form of outputting a sound or a form of not outputting a sound, and
   when the incoming call detector detects presence of the incoming call, and the person detector detects that the person is not present within the first range, the controller causes the incoming call notification unit to notify of presence of the incoming call in a form of outputting a sound regardless of whether or not the incoming call notifying mode detected by the incoming call notifying mode detector is a mode in which the communication terminal outputs a sound to notify of the incoming call.

8. The autonomous travel-type cleaner according to claim 4, further comprising a person detector that detects whether or not a person is present within a first range, wherein
   when the incoming call detector detects presence of the incoming call, the incoming call notifying mode detected by the incoming call notifying mode detector is a mode in which the communication terminal notifies of the incoming call in a form of outputting a sound, and the person detector detects that the person is not present within the first range, the controller controls the drive unit to move the housing out of the first range.

9. The autonomous travel-type cleaner according to claim 1, wherein the first range is a range based on a cleaning area that is an area autonomously cleaned by the autonomous travel-type cleaner or a range based on a position of the autonomous travel-type cleaner.

10. The autonomous travel-type cleaner according to claim 1, further comprising a communication terminal detector that detects whether or not the communication terminal is present within a second range, wherein
    the controller controls a notification operation of the incoming call notification unit based on a detection result of the person detector, a detection result of the incoming call detector, and a detection result of the communication terminal detector.

11. The autonomous travel-type cleaner according to claim 1, further comprising a communication terminal detector that detects whether or not the communication terminal is present within a second range, wherein
    when the incoming call detector detects presence of the incoming call, the person detector detects that the person is present within the first range, and the communication terminal detector detects that the communication terminal is not present within the second range, the controller causes the incoming call notification unit to notify of presence of the incoming call.

12. The autonomous travel-type cleaner according to claim 1, wherein the incoming call notification unit notifies of presence of the incoming call in a form including at least one of light emission, sound output, and a traveling mode of the housing.

13. The autonomous travel-type cleaner according to claim 1, further comprising a call state detector that detects whether or not the communication terminal is in a call state, wherein
    when the call state detector detects that the communication terminal is in a call state while the controller causes the incoming call notification unit to notify of presence of the incoming call, the controller stops notification by the incoming call notification unit.

14. A control method in an autonomous travel-type cleaner capable of communicating with a communication terminal, the control method comprising:
    an incoming call detection step of detecting whether or not there is an incoming call to the communication terminal;
    a person detection step of detecting whether or not a person is present within a first range; and
    a control step of controlling a notification operation of an incoming call notification unit for notifying of presence of the incoming call based on a detection result in the person detection step and a detection result in the incoming call detection step.

15. A control method in an autonomous travel-type cleaner capable of communicating with a communication terminal, the control method comprising:
    an incoming call detection step of detecting whether or not there is an incoming call to the communication terminal;
    an incoming call notifying mode detection step of detecting an incoming call notifying mode of the communication terminal; and a control step of controlling a notification operation of an incoming call notification unit for notifying of presence of the incoming call based on a detection result in the incoming call notifying mode detection step and a detection result in the incoming call detection step.

* * * * *